(12) United States Patent
Nakamura

(10) Patent No.: US 9,039,857 B2
(45) Date of Patent: May 26, 2015

(54) SHEET PASTING METHOD AND SHEET PASTING TOOL

(75) Inventor: Masahiro Nakamura, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 14/122,524

(22) PCT Filed: Jul. 26, 2012

(86) PCT No.: PCT/JP2012/068912
§ 371 (c)(1),
(2), (4) Date: Nov. 26, 2013

(87) PCT Pub. No.: WO2013/021825
PCT Pub. Date: Feb. 14, 2013

(65) Prior Publication Data
US 2014/0090775 A1 Apr. 3, 2014

(30) Foreign Application Priority Data
Aug. 9, 2011 (JP) .................................. 2011-173997

(51) Int. Cl.
*B29C 65/48* (2006.01)
*B32B 37/26* (2006.01)
(Continued)

(52) U.S. Cl.
CPC ......... *B32B 37/025* (2013.01); *Y10T 156/1051* (2015.01); *Y10T 156/1044* (2015.01);
(Continued)

(58) Field of Classification Search
CPC ...... B32B 37/025; B60B 7/00; B60B 7/0073; B60B 7/06; B60B 7/061; B60B 7/065; B60B 2310/661; B60B 290/212; B60B 2900/5112; B65B 15/00; Y10T 156/1044; Y10T 156/1049; Y10T 156/1051

USPC ......... 156/235, 247, 249, 297, 299, 300, 537, 156/540, 542
See application file for complete search history.

(56) References Cited

U.S. PATENT DOCUMENTS 3,854,448 A * 12/1974 Kromanaker ................. 118/505
3,918,762 A * 11/1975 Hampshire ................ 301/37.43
(Continued)

FOREIGN PATENT DOCUMENTS

| CN | 100503406 C | 6/2009 |
| DE | 102 18 488 A1 | 11/2003 |

(Continued)

OTHER PUBLICATIONS

English Abstract of JP 2009-280128 (Feb. 22, 2015).*
(Continued)

*Primary Examiner* — Sing P Chan
(74) *Attorney, Agent, or Firm* — Oliff PLC

(57) ABSTRACT

An adherend surface of an adherend is stuck with a protection sheet being in substantially the same shape as the adherend surface and including base and adhesive layer by a method including: sticking the sheet on a first surface of a sticking tool foldable along a symmetry-axis position of the sheet; folding the tool with the sheet such that a second surface opposite to the first surface comes inside; peeling the sheet to a folded portion of the tool to expose a portion of the adhesive layer with the tool folded; pressing the exposed portion of the adhesive layer against the adherend surface to stick a portion of the sheet on the adherend; and moving the tool along the adherend surface to expose a remaining portion of the adhesive layer and pressing the remaining portion against the adherend surface to stick a remaining portion of the sheet on the adherend.

10 Claims, 20 Drawing Sheets

(51) Int. Cl.
  *B32B 37/00* (2006.01)
  *B60B 7/06* (2006.01)
  *B65B 15/00* (2006.01)
  *B60B 7/00* (2006.01)

(52) U.S. Cl.
  CPC ........... *Y10T156/1049* (2015.01); *B60B 7/065* (2013.01); *B60B 2900/212* (2013.01); *B60B 2900/5112* (2013.01); *B65B 15/00* (2013.01); *B60B 7/00* (2013.01); *B60B 7/0073* (2013.01); *B60B 7/06* (2013.01); *B60B 7/061* (2013.01); *B60B 2310/661* (2013.01)

(56) References Cited

U.S. PATENT DOCUMENTS

| | | | | |
|---|---|---|---|---|
| 5,131,727 | A | * | 7/1992 | Johnson .................... 301/37.41 |
| 2004/0018330 | A1 | * | 1/2004 | McDonald .................... 428/43 |
| 2005/0121148 | A1 | | 6/2005 | Nakamura |
| 2005/0263241 | A1 | * | 12/2005 | Lidicky et al. ................. 156/216 |
| 2006/0107896 | A1 | * | 5/2006 | Buckingham ................. 118/504 |
| 2008/0099152 | A1 | | 5/2008 | Nakamura |
| 2009/0320996 | A1 | * | 12/2009 | Fujimoto et al. ............... 156/211 |
| 2014/0031595 | A1 | * | 1/2014 | Tirtowidjojo et al. ......... 570/156 |
| 2014/0290844 | A1 | * | 10/2014 | Haruyama ................... 156/249 |

FOREIGN PATENT DOCUMENTS

| | | | |
|---|---|---|---|
| GB | 2408716 A | | 6/2005 |
| JP | S5544749 U | | 3/1980 |
| JP | Y2-59-29886 | | 8/1984 |
| JP | A-9-58264 | | 3/1997 |
| JP | 2003-267001 A | | 9/2003 |
| JP | 2005-155758 A | | 6/2005 |
| JP | A-2005-161709 | | 6/2005 |
| JP | B2-3879985 | | 2/2007 |
| JP | A-2007-131131 | | 5/2007 |
| JP | 2009280128 A | * | 12/2009 |
| JP | 2010-149643 A | | 7/2010 |
| JP | A-2010-143350 | | 7/2010 |
| JP | 2013203222 A | * | 10/2013 |
| JP | 2013203223 A | * | 10/2013 |

OTHER PUBLICATIONS

Eglish Abstract of JP 2013-203222 (Feb. 22, 2015).*
English Abstract of JP 2013-203223 (Feb. 22, 2015).*
International Search Report issued in International Patent Application No. PCT/JP2012/068912 mailed Oct. 9, 2012.
Oct. 22, 2014 Office Action issued in Chinese Patent Application No. 201280036581.3.
Mar. 6, 2015 Search Report issued in European Application No. 12822806.1.

* cited by examiner

SHEET PASTING METHOD AND SHEET PASTING TOOL

TECHNICAL FIELD

The present invention relates to a sheet sticking method and a sheet sticking tool.

BACKGROUND ART

Typically, for transportation of an article, an adhesive sheet such as a protection sheet is stuck on a surface of the article. This aims to, for instance, prevent the article from being damaged or getting dirty.

For instance, for transportation of an automobile or the like, a protection sheet is stuck on a surface of each wheel of the automobile or the like. This aims to, for instance, prevent the surface of each wheel from being damaged or getting dirty as well as prevent generation of rust on a disc brake within the wheel.

Patent Literature 1 describes an example of a protection sheet such as a cover member.

The cover member of Patent Literature 1, which is made of an impermeable film of polyethylene or the like, includes an adhesive layer. Hundreds of the cover members are layered on one another with the adhesive layers being interposed and supplied to an automobile assembly line. Such an arrangement in which a plurality of cover members are layered on one another is occasionally referred to as a multilayered type.

A worker of the automobile assembly line peels the layered cover members layer by layer and sticks it on a wheel.

For multilayered-type protection sheets, a sticking tool 100 as shown in FIG. 20 is used. The sticking tool 100 is formed in a circular shape whose diameter is substantially the same as a length of a protection sheet 200. On the sticking tool 100, a plurality of protection sheets 200 are layered on one another.

In order to stick the multilayered-type protection sheets 200 as shown in FIG. 20, a worker goes through the following steps. First, the uppermost one of the protection sheets 200 layered on the sticking tool 100 is half-peeled so that an adhesive layer 201 is partially exposed. Next, while holding the sticking tool 100, the worker positions the exposed portion of the adhesive layer 201 relative to the wheel and sticks the exposed portion on the wheel. Subsequently, the worker moves the sticking tool 100 along an adherend surface of the wheel to expose a remaining portion of the adhesive layer 201 and sticks the protection sheet 200 on the wheel. By following the above steps for sticking the protection sheet 20 on the wheel after half-peeling the protection sheet 200, the protection sheet 200 can be easily positioned. This is because the above steps are typically followed.

CITATION LIST

Patent Literature(s)

Patent Literature 1: Japanese Patent No. 3879985

SUMMARY OF THE INVENTION

Problems to be Solved by the Invention

A peeling condition is visually checked during the step of half-peeling one of the protection sheets layered on such a sticking tool as described above. It may be difficult for an unskilled worker to peel the protection sheet to a predetermined position and thus the protection sheet is likely to be insufficiently peeled or excessively peeled. Further, since an adhesive sheet such as the protection sheet has a large width and is not rigidly formed, it is likely that the sheet is folded and the adhesive layer sticks to itself or to something else, so that the sticking operation takes a long time.

Not only for sticking the protection sheet on the surface of the wheel but also for sticking the sheet on any other adherend, it is difficult to peel the sheet to a predetermined position.

Owing to the above difficulties, when the typical tool and method are employed, it takes a long time for a worker inexperienced in such a sheet-peeling operation to peel the sheet to a predetermined position. When the sheet fails to be peeled to the predetermined position, it is likely that positioning of the sheet relative to the wheel becomes difficult and thus the sticking operation takes a long time in such an automobile assembly line as described above. As a result, when a worker of the automobile assembly line is less skilled, it is likely that the takt time of the operation for sticking a sheet on the wheel becomes longer, resulting in a lowered production efficiency.

In view of the above, it has been demanded to provide a method and a sticking tool by which a sheet is easily stuck to an adherend.

An object of the invention is to provide a sheet sticking method and a sheet sticking tool by which a sheet is easily stuck to an adherend.

Means for Solving the Problems

According to an aspect of the invention, a sheet sticking method of sticking a sheet on an adherend surface of an adherend, the sheet being formed in substantially the same shape as the adherend surface, the sheet including a base and an adhesive layer formed on one surface of the base, the sheet sticking method includes: sticking the sheet on a first surface of a sticking tool through the adhesive layer, the sticking tool being foldable along a symmetry-axis position of the sheet; folding the sticking tool along with the sheet such that a second surface opposite to the first surface of the sticking tool comes inside; peeling the sheet to a folded portion of the sticking tool to expose a portion of the adhesive layer while the sticking tool is folded; pressing the exposed portion of the adhesive layer against the adherend surface to stick a portion of the sheet on the adherend; and exposing a remaining portion of the adhesive layer of the sheet and pressing the remaining portion against the adherend surface to stick a remaining portion of the sheet on the adherend.

It is preferable that the sheet sticking tool according to the above aspect further includes: after the peeling of the sheet to the folded position of the sticking tool to expose the portion of the adhesive layer, turning over the sheet in a folding direction of the sticking tool with the portion of the adhesive layer being exposed; and unfolding the folded sticking tool in a direction opposite to the folding direction of the sticking tool with the portion of the adhesive layer being exposed and the sheet being turned over.

It is preferable that the sheet sticking method according to the above aspect further includes, after the peeling of the sheet to the folded position of the sticking tool to expose the portion of the adhesive layer, turning over the sheet in a folding direction of the sticking tool with the portion of the adhesive layer being exposed.

In the above aspect, it is preferable that for sticking the remaining portion of the sheet on the adherend, the sticking tool is moved along the adherend surface to expose the remaining portion of the adhesive layer of the sheet.

In the above aspect, it is preferable that each of the sticking tool, the sheet and the adhesive layer is made of a light-transmissive material.

In the above aspect, it is preferable that the adherend surface of the adherend is formed in a substantially circular shape, the sheet is formed in a substantially circular shape that is substantially the same in diameter as the adherend surface, and the sticking tool is foldable along a diametral position of the sheet.

According to another aspect of the invention, a sheet sticking tool usable to stick a sheet on an adherend surface of an adherend, the sheet being formed in substantially the same shape as the adherend surface, the sheet including a base and an adhesive layer formed on one surface of the base, the sheet sticking tool includes: a first body having a first side that is substantially as long as a symmetry axis of the sheet within a contour of the sheet; a second body having a second side that is substantially as long as the symmetry axis within the contour of the sheet; and a connecting portion through which the first side of the first body and the second side of the second body are connected to each other and at which the sheet sticking tool is foldable.

In the above aspect, it is preferable that the connecting portion is provided by a connecting sheet that is stuck on surfaces of the first body and the second body to connect the first body and the second body, the sheet is stuck on the connecting sheet, and an adhesive force between the connecting sheet and the surfaces of the first body and the second body is larger than an adhesive force between the sheet and the connecting sheet.

In the above aspect, it is preferable that the adherend surface of the adherend is formed in a substantially circular shape, the sheet is formed in a substantially circular shape that is substantially the same in diameter as the adherend surface, the first body is formed in a substantially semicircular shape and has a first chord (the first side) substantially as long as a diameter of the sheet, and the second body is formed in a substantially semicircular shape and has a second chord (the second side) substantially as long as the diameter of the sheet, and the first chord of the first body and the second chord of the second body are connected to each other through the connecting portion.

In the above aspect, it is preferable that the adherend is provided by an automobile wheel.

Advantages of the Invention

According to the sheet sticking method of an aspect of the invention, the sticking tool for the sheet sticking method is foldable at the symmetry-axis position of the sheet and the sheet is stuck on the first surface of the sticking tool.

For exposing the adhesive surface of the sheet, after folding the sticking tool, the sheet is peeled to the folded portion. The sheet is prevented from being further peeled at the folded portion. Since the sheet cannot be further peeled after being peeled to the symmetry-axis position thereof, the sheet is kept half-peeled. Therefore, regardless of the skill of a worker, the sheet can be easily half-peeled, thereby easily sticking the sheet on the adherend.

The sheet sticking tool according to another aspect of the invention includes the first body having the first side being substantially as long as the symmetry axis of the sheet and the second body having the second side being substantially as long as the symmetry axis, the first side of the first body and the second side of the second body being connected to each other through the connecting portion in a foldable manner. With this arrangement, the sheet sticking tool is usable for carrying out the sheet sticking method according to the above aspect. Therefore, regardless of the skill of a worker, the sheet can be easily half-peeled, thereby easily sticking the sheet on the adherend.

When a plurality of protection sheets are layered on one another with the adhesive layers being interposed, the sticking tool is folded each time when one of the protection sheets is to be stuck on the adherend. Since the connecting portion is provided according to the above aspect, it is possible to fold the sticking tool in half at the same position each time. Therefore, any one of the layered protection sheets can be stably half-peeled, which contributes to stabilizing the sticking operation.

Incidentally, when a member has/is "substantially the same shape", "substantially as long as" or "substantially as large as" herein, it is not intended that the member necessarily has/is "exactly the same shape", "exactly as long as" or "exactly as large as." For instance, the sheet may be different in size from the adherend as long as even when the sheet stuck on the adherend slightly protrudes from the contour of the adherend, the sheet is not easily detached from the adherend because of the protruding portion.

According to the above aspect, the sticking tool may be provided in a form of a plate, a film, a sheet or the like as long as the sticking tool is made of a material with elastic stiffness.

According to the sheet sticking method of the above aspect, after the sheet is peeled to the folded portion to expose the portion of the adhesive layer of the sheet, the following steps are further performed. The sheet is turned over in the folding direction of the sticking tool with the portion of the adhesive layer being exposed, and the folded sticking tool is unfolded in the direction opposite to the folding direction of the sticking tool with the portion of the adhesive layer being exposed and the sheet being turned over.

When a sheet made of a material with less elastic stiffness is held only at a peeled portion thereof, the sheet cannot be stably held and thus is difficult to be positioned and stuck.

In view of the above, when the sheet is turned over in the folding direction of the sticking tool to expose the adhesive layer and then the sticking tool is unfolded with the sheet being turned over, the peeled portion of the sheet can be held along with the sticking tool. In other words, as compared with an arrangement in which only the peeled half of the protection sheet is held, a portion with a larger thickness can be held. Moreover, the sticking tool also serves as a support plate for supporting the peeled half of the protection sheet and thus the sheet can be stably held. Therefore, the sheet can be easily positioned and stuck on the adherend.

According to the sheet sticking method of the above aspect, after the sheet is peeled to the folded portion to expose the portion of the adhesive layer of the sheet, the sheet is turned over in the folding direction with the portion of the adhesive layer being exposed. Subsequently, the exposed portion of the adhesive layer is pressed against the adherend surface, thereby sticking the portion of the sheet on the adherend. In other words, without unfolding the folded sticking tool in the direction opposite to the folding direction of the sticking tool, the sheet is to be stuck while being kept turned over.

With such a sheet sticking method, the sheet can also be stably held. Therefore, the sheet can be easily positioned and stuck on the adherend.

According to the sheet sticking method of the above aspect, for sticking a remaining portion of the sheet on the adherend, the sticking tool is moved along the adherend surface to expose a remaining portion of the adhesive layer. In this manner, while getting exposed, the remaining portion of the sheet can be easily and quickly stuck on the adherend surface.

According to the sheet sticking method of the above aspect, when each of the sticking tool, the sheet and the adhesive layer is made of a light-transmissive material, the shape and the position of the adherend can be visually checked through these members for sticking the sheet, so that the sheet can be easily positioned relative to the adherend.

According to the sheet sticking method of the above aspect, the adherend surface of the adherend is formed in the substantially circular shape and the sheet is similarly formed in the substantially circular shape and is the same in diameter as the adherend surface. Moreover, the sticking tool is foldable along the diametral position of the sheet.

With the above arrangement, the sheet can be peeled in a substantially semicircular shape and the arc of the exposed semicircular portion of the adhesive layer can be easily aligned with the outer circumference of the substantially circular shape of the adherend surface. Therefore, the sheet can be easily positioned and stuck on the adherend.

Incidentally, with the expression "substantially circular shape" herein, the adherend, sheet and the sticking tool are not necessarily in an exactly circular shape.

When the sheet sticking tool according to the above aspect includes the first body and the second body connected to each other through the connecting sheet, the connecting sheet allows the sticking tool to be foldable.

The adhesive force between the connecting sheet and the surfaces of the first body and the second body may be larger than the adhesive force between the sheet and the connecting sheet. With this arrangement, when the sheet is peeled from the connecting sheet, the connecting sheet is prevented from being peeled from the sticking tool along with the sheet.

According to the sheet sticking tool of the above aspect, the adherend surface of the adherend is formed in the substantially circular shape and the sheet is similarly formed in the substantially circular shape and is the same in diameter as the adherend surface. Moreover, the sticking tool includes: the first body and the second body each being formed in the substantially semicircular shape having the chord substantially as long as the diameter of the sheet; and the connecting portion that connects the chords of these bodies. With this arrangement, the sticking tool is also formed in the circular shape substantially as large as the sheet, so that when the sticking tool and the sheet are stuck together with their outer circumferences being aligned, the sticking tool can be folded along the diametral position of the sheet with a higher reliability, thereby easily peeling the sheet in a semicircular shape.

The sheet sticking tool according to the above aspect may be used for an adherend such as an automobile wheel. With the sheet sticking tool according to the above aspect, the sheet can be easily half-peeled, thereby quickly sticking the sheet on the wheel.

Additionally, with the sheet sticking tool according to the above aspect, the adhesive layer can be easily exposed in the substantially semicircular shape. The arc of the substantially semicircular shape of the adhesive layer is aligned with the outer circumference of the wheel for positioning, so that the sheet can be easily positioned.

As a result, the sheet can be stuck on the wheel with improved efficiency in an automobile assembly line.

DESCRIPTION OF EMBODIMENT(S)

Exemplary embodiments according to the invention will be described below with reference to the attached drawings.

First Exemplary Embodiment

A first exemplary embodiment will be described with reference to an example where an adherend is a substantially circular wheel of an automobile.

Figure 1:
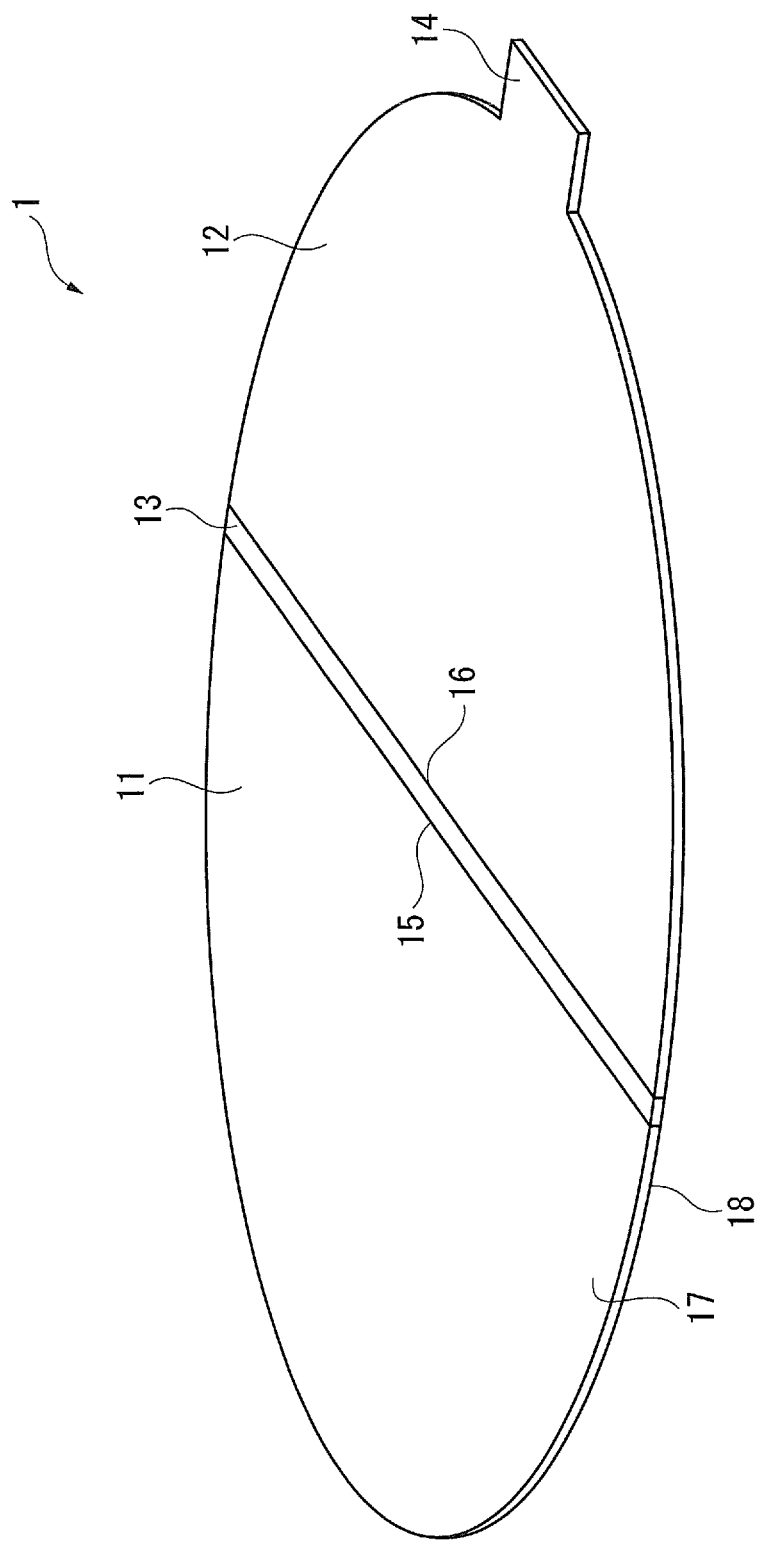
FIG. 1 is a perspective view showing a sheet sticking tool according to a first exemplary embodiment of the invention.
Figure 2:
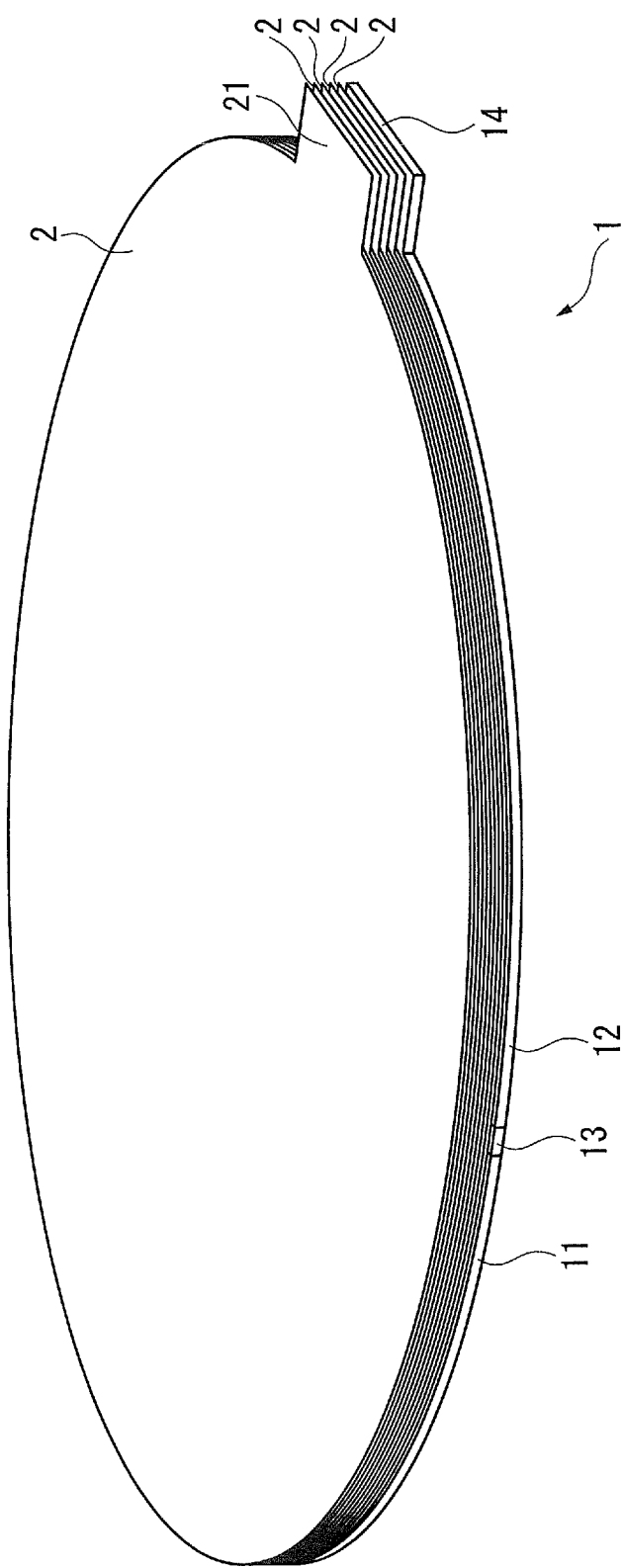
FIG. 2 is a perspective view showing the sheet sticking tool with a plurality of sheets layered thereon.
Figure 3:
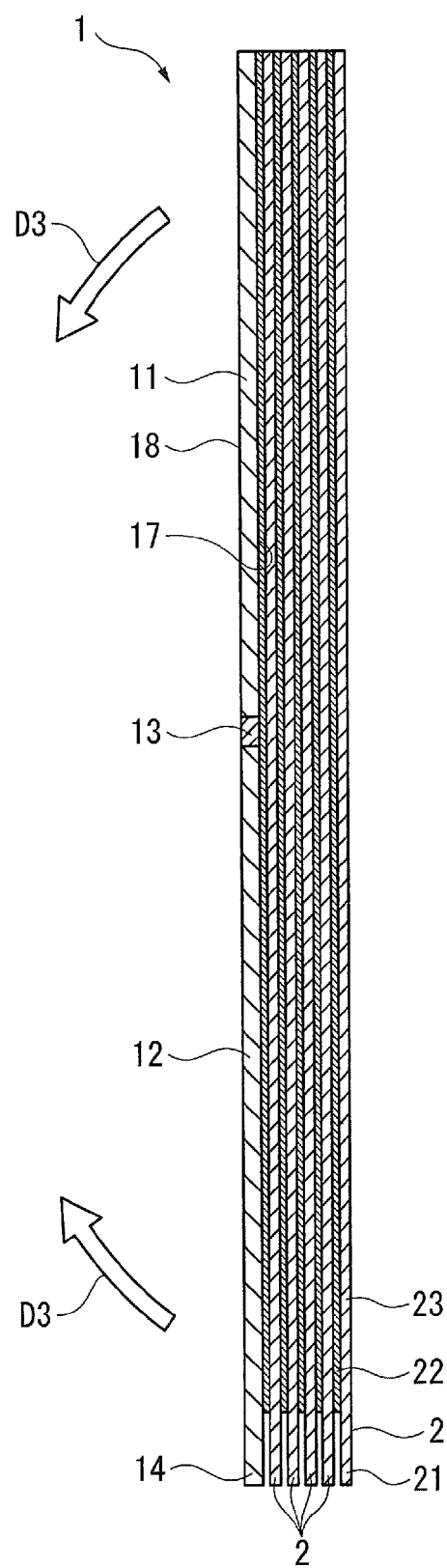
FIG. 3 is a sectional view showing the sheet sticking tool with the plurality of sheets layered thereon.

FIG. 1 shows a sheet sticking tool 1 according to the first exemplary embodiment. FIG. 2 shows the sheet sticking tool 1 on which a plurality of protection sheets 2 (a sheet according to the invention) are layered. FIG. 3 is a sectional view showing the sheet sticking tool 1 on which the plurality of protection sheets 2 are layered. The sheet sticking tool 1 according to the first exemplary embodiment is usable to stick each of the protection sheets 2 on a surface of a wheel of the automobile (an adherend surface according to the invention).

Protection Sheet

As shown in FIG. 3, each of the protection sheets 2 includes a base 23 and an adhesive layer 22 provided on one surface of the base 23. Each of the protection sheets 2 is formed in a substantially circular shape whose diameter is substantially the same as the diameter of the wheel. As shown in FIGS. 2 and 3, the plurality of protection sheets 2, which are layered on one another with the adhesive layers 22 being interposed, are stuck on the sheet sticking tool 1.

Each of the protection sheets 2 can cover the surface of the wheel.

As shown in FIG. 2, each of the protection sheets 2 is provided with a tab 21. A worker can pinch the tab 21 to peel the protection sheet 2 from the sheet sticking tool 1.

A material for the base 23 is not subject to a particular limitation as long as the material contributes to preventing the surface of the wheel from being damaged or getting dirty or preventing generation of rust on a disc brake provided in the wheel. For the base 23, synthetic resin films of polyethylene, polypropylene, polyethylene terephthalate, polycarbonate, polyurethane, polyvinyl chloride and polyimide, sheet materials such as an unwoven fabric, metal films such as aluminum foil, and the like are usable. The base 23 is preferably made of a light-transmissive material. When the base 23 is made of a light-transmissive material, it is possible to position each of the protection sheets 2 while visually checking the position of the wheel. The thickness of the base 23, which is not subject to a particular limitation and may be determined depending on required properties, is preferably, for instance, in a range from 10 μm to 200 μm, particularly preferably from 20 μm to 100 μm. When the thickness of the protection sheet 2 is set in the above range, the protection sheets 2 are unlikely to be torn and can thus be further effective in protecting the adherend. Further, since the protection sheets 2 are not excessively thickened, the protection sheets 2 can easily follow the shape of the adherend and the cost thereof can be reduced. A polyethylene having a thickness of 50 μm is used for the base 23 of each of the protection sheets 2 according to the first exemplary embodiment.

A material for the adhesive layer 22 is not subject to a particular limitation as long as the material can be stuck on the surface of the wheel. For the adhesive layer 22, an acrylic adhesive, a silicone adhesive, a rubber adhesive, a polyester adhesive, a polyethylene adhesive, a polypropylene adhesive, a polyurethane adhesive, an ethylene-vinylacetate (EVA) adhesive and the like are usable. Among the above, an acrylic adhesive is excellent in adhesive force and thus is preferably usable. The adhesive layer 22 is preferably made of a light-transmissive material as well as the base 23. When the adhesive layer 22 is made of a light-transmissive material, it is possible to stick each of the protection sheets 2 while visually checking the position of the wheel through the base 23 and the adhesive layer 22.

The thickness of the adhesive layer 22, which is not subject to a particular limitation, is preferably, for instance, in a range from 2 μm to 100 μm, particularly preferably from 3 μm to 50 μm in view of a balance between adhesive properties and cost. The adhesive layer 22 according to the first exemplary embodiment is made of an acrylic adhesive having a thickness of 15 μm.

The thickness of each of the protection sheets 2, which is not subject to a particular limitation, is preferably in a range from 12 μm to 300 μm.

Sheet Sticking Tool

As shown in FIGS. 2 and 3, the sheet sticking tool 1 is formed in a substantially circular shape substantially as large as the protection sheets 2. The sheet sticking tool 1 not only serves to support the protection sheets 2 but also serves as a jig when the protection sheets 2 are to be stuck. The sheet sticking tool 1 is foldable at a symmetry-axis position of each of the protection sheets 2. According to the exemplary embodiment, since each of the protection sheets 2 is formed in the substantially circular shape, the symmetry-axis position coincides with a diametral position of each of the protection sheets 2, so that the sheet sticking tool 1 is foldable at the diametral position of each of the protection sheets 2. It should be noted that the diametral position is not necessarily exactly the same as the diameter but may be a position at which the circular protection sheets 2 can be folded substantially in half.

The sheet sticking tool 1 includes a first body 11, a second body 12, a connecting portion 13 that connects the first body 11 and the second body 12, and a tab 14. When the first body 11 and the second body 12 are described at the same time, they are hereinafter occasionally referred to as the bodies 11, 12.

The plurality of protection sheets 2 are layered on a first surface 17 of the sheet sticking tool 1. When the protection sheets 2 are layered, the tabs 14 are aligned with the tab 21 as shown in FIGS. 2 and 3.

The first body 11 includes a first chord 15 that is substantially as long as the diameter of the protection sheets 2 and the second body 12 includes a second chord 16 that is substantially as long as the diameter of the protection sheets 2, the first chord 15 and the second chord 16 being formed in a substantially semicircular plate-like shape. The first body 11 and the second body 12 are formed in the same shape except that the second body 12 is provided with the tab 14. When the first chord 15 and the second chord 16 are described at the same time, they are hereinafter occasionally referred to as the chords 15, 16.

The connecting portion 13 is foldable at portions to which the bodies 11, 12 are connected. The sheet sticking tool 1 is foldable such that a second surface 18, which is opposite to the first surface 17, comes inside.

The substantially semicircular bodies 11 and 12 are connected to each other at the chords 15, 16 via the connecting portion 13. When seeing the sheet sticking tool 1 as a whole, the connecting portion 13 positionally coincides with the diameter of the circle as shown in FIG. 1. When being folded at the connecting portion 13, the sheet sticking tool 1 is folded at the diametral position, so that the bodies 11 and 12 are laid on each other in a semicircle.

The connecting portion 13 allows the sheet sticking tool 1 to be foldable at least in one direction and may allow the sheet sticking tool 1 to be foldable in both opposite directions. When the connecting portion 13 allows the sheet sticking tool 1 to be foldable in both opposite directions, the protection sheets 2 are layered on either one of the surfaces of the sheet sticking tool 1, while when the connecting portion 13 allows the sheet sticking tool 1 to be foldable only in one direction, the protection sheets 2 are layered on the surface that comes outside when the sheet sticking tool 1 is folded.

Regarding a folding angle of the sheet sticking tool 1, when the sheet sticking tool 1 is folded, an angle between the first body 11 and the second body 12 becomes preferably 90 degrees or smaller. The smaller the angle is, the more easily each of the protection sheets 2 can be peeled to the diametral position.

The material and thickness of the bodies 11 and 12 are not subject to a particular limitation as long as the bodies 11 and 12 can have an elastic stiffness enough to serve as a support plate for supporting the protective sheets 2. As the material for the bodies 11, 12, synthetic resin films of polyethylene, polypropylene, polyethylene terephthalate, polycarbonate, polyurethane, polyvinyl chloride, polyimide and the like, papers such as a high-quality paper, a coat paper, a kraft paper and a glassine paper, sheet materials such as an unwoven fabric, metal plates of aluminum and the like are usable. The bodies 11, 12 are preferably made of a light-transmissive material as well as the base 23 and the adhesive layer 22. When the bodies 11, 12 are made of a light-transmissive material, it is possible to stick each of the protection sheets 2 while visually checking the position of the wheel through the bodies 11, 12, the base 23 and the adhesive layer 22.

The thickness of the bodies 11, 12, which is not subject to a particular limitation and may be determined depending on required properties, is preferably, for instance, in a range from 50 μm to 100 mm, particularly preferably from 75 μm to 150 μm. A polypropylene plate having a thickness of 1 mm is used for the bodies 11, 12 according to the first exemplary embodiment.

A material for the connecting portion 13 is not subject to a particular limitation as long as the connecting portion 13 serves to connect the bodies 11, 12 to each other and is repeatedly foldable. The connecting portion 13 is exemplified by an adhesive tape, an adhesive sheet and a hinge. Examples of the adhesive tape and the adhesive sheet include a tape and a sheet including a base and an adhesive layer formed on one surface of the base. For the base of such a tape or sheet, the materials such as paper, cloth and synthetic resins listed above in relation to the base 23 are usable. For the adhesive layer of such a tape or sheet, a natural rubber adhesive, a synthetic rubber adhesive, an acrylic adhesive, an urethane adhesive, a styrene adhesive, a silicone adhesive, a polyester adhesive and the like are usable. According to the first exemplary embodiment, the bodies 11, 12 are connected to each other through an adhesive tape.

The connecting portion 13 preferably has a width sufficient to allow the bodies 11, 12 to be laid on each other when the connecting portion 13 is folded. When the width of the connecting portion 13 is excessively large, the folded position is shifted from the diametral position of the sheet sticking tool 1, so that it may be difficult to half-peel each of the protection sheets 2.

Sheet Sticking method

Next, description will be made on a method of sticking the protection sheets 2 according to the first exemplary embodiment with reference to the attached drawings.

FIGS. 4 to 8 are sectional views schematically showing steps of the method of sticking the protection sheets 2.

FIG. 3 is the sectional view showing a condition of the protection sheets 2 layered on the sheet sticking tool 1 before the method of sticking the protection sheets 2 is carried out. Although five of the protection sheets 2 (a multilayered body) are layered on the sheet sticking tool 1 in the sectional view of FIG. 3, the number of the layered protection sheets 2 is not limited to five. In other words, the number of the layered protection sheets 2 is not subject to a particular limitation as long as the sheet sticking tool 1 and the layered protection sheets 2 can be folded together. For instance, when each of the protection sheets 2 is made of a polyethylene having a thickness of 50 μm and is provided with the adhesive layer 22 having a thickness of 15 μm as in the first exemplary embodiment, approximately 20 to 30 of the protection sheets 2 may be layered.

First Step

Figure 4:
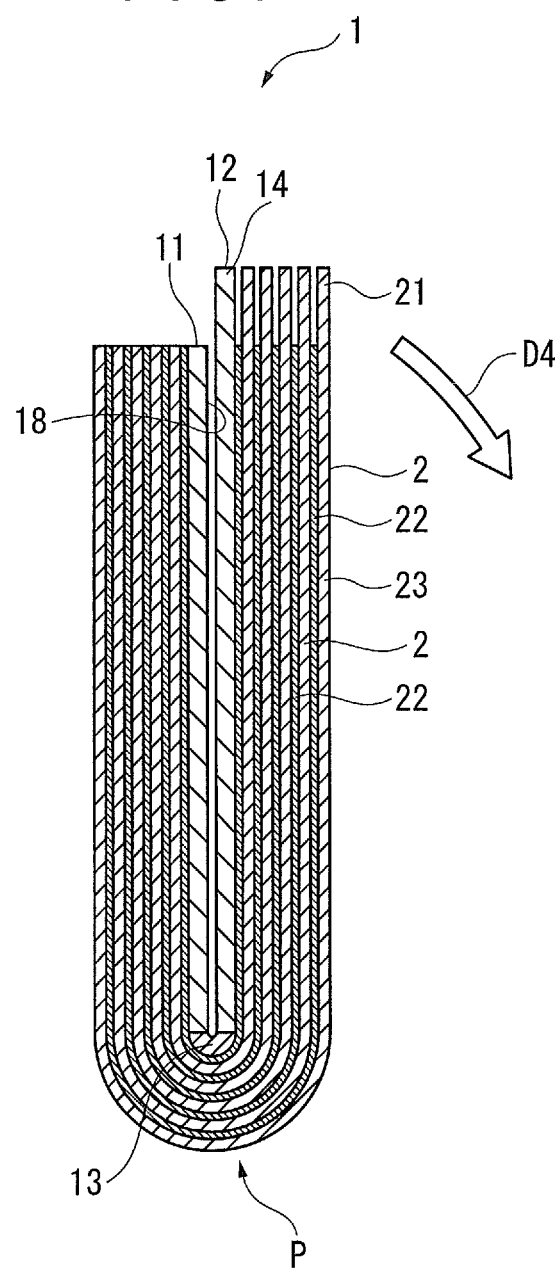
FIG. 4 is a sectional view showing a condition after a first step of a sheet sticking method according to the first exemplary embodiment of the invention.

FIG. 4 is a sectional view showing a condition after a first step for folding the sheet sticking tool 1 in an arrow D3 direction shown in FIG. 3.

In the first step, the sheet sticking tool 1 is folded in half such that the second surface 18 comes inside (see the arrow D3 direction shown in FIG. 3), the second surface 18 being opposite to the first surface 17 on which the protection sheets 2 are layered. As shown in FIG. 4, the sheet sticking tool 1 is folded at the connecting portion 13 and the layered protection sheets 2 are also folded at a position corresponding to the connecting portion 13 (a folded position P).

Second Step

Figure 5:
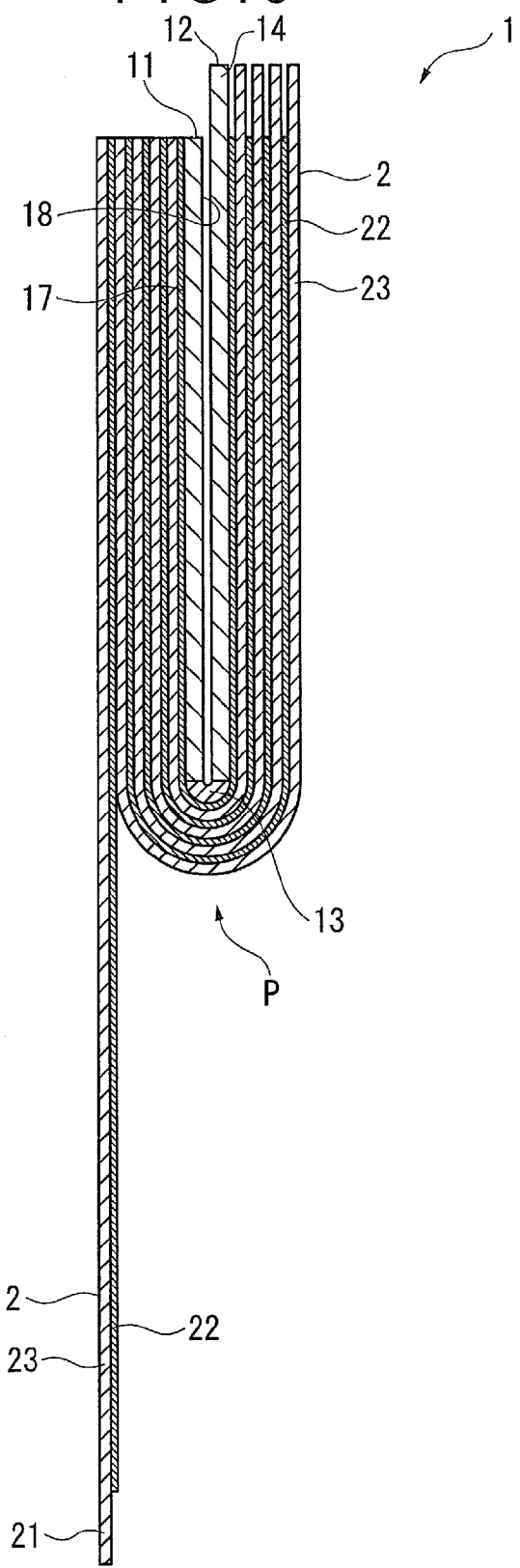
FIG. 5 is a sectional view showing a condition after a second step of the sheet sticking method.

FIG. 5 is a sectional view showing a condition after a second step for half-peeling one of the protection sheets 2.

In the second step, the tab 21 of the uppermost one of the protection sheets 2 (the multilayered body) is pinched and pulled in an arrow D4 direction shown in FIG. 4, thereby peeling the uppermost protection sheet 2 to the folded position P. Since the protection sheets 2 are folded at the folded position P along with the sheet sticking tool 1, the uppermost protection sheet 2 cannot be further peeled by pulling the tab 21 at the folded position P. This is because the direction in which the protection sheet 2 is pulled to be peeled to the folded position P in the second step is different from a direction in which the protection sheet 2 is pulled for further peeling the protection sheet 2 (i.e., peeling a remaining portion of the protection sheet 2) from the folded position P. Thus, as shown in FIG. 5, the protection sheet 2 is half-peeled in the second step, so that the adhesive layer 22 is partly exposed in a substantially semicircular shape.

Third Step

Figure 6:
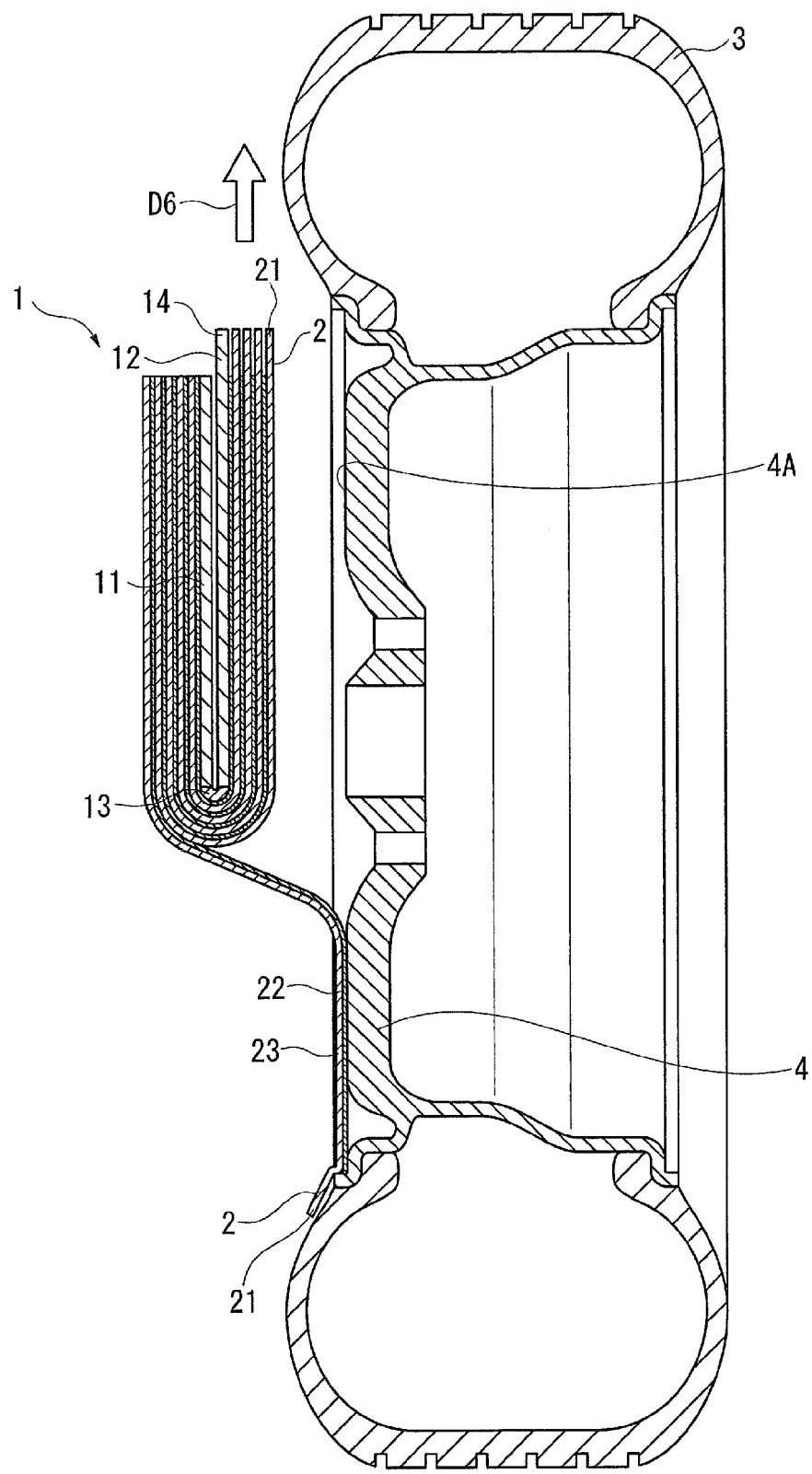
FIG. 6 is a sectional view showing a condition after a third step of the sheet sticking method.

FIG. 6 is a sectional view showing a condition after a third step for sticking the adhesive layer 22 on a wheel 4 of an automobile tire 3.

In the third step, firstly, the sheet sticking tool 1 and the protections sheets 2 are held by a portion including the tab 14 and a portion including the tabs 21.

After the sheet sticking tool 1 and the protection sheets 2 are held, the portion of the adhesive layer 22 exposed in the substantially semicircular shape is positioned to be aligned with the outer circumference of a wheel surface 4A and the adhesive layer 22 is pressed against the wheel surface 4A, thereby sticking substantially the half of the protection sheet 2. When the sheet sticking tool 1, the protection layers 2 and the adhesive layers 22 are made of a light-transmissive material, it is possible to visually check the shape and the position of the wheel 4 through the sheet sticking tool 1, the protection sheets 2 and the adhesive layers 22 for sticking the protection sheet 2 on the wheel 4.

Fourth Step

Figure 7:
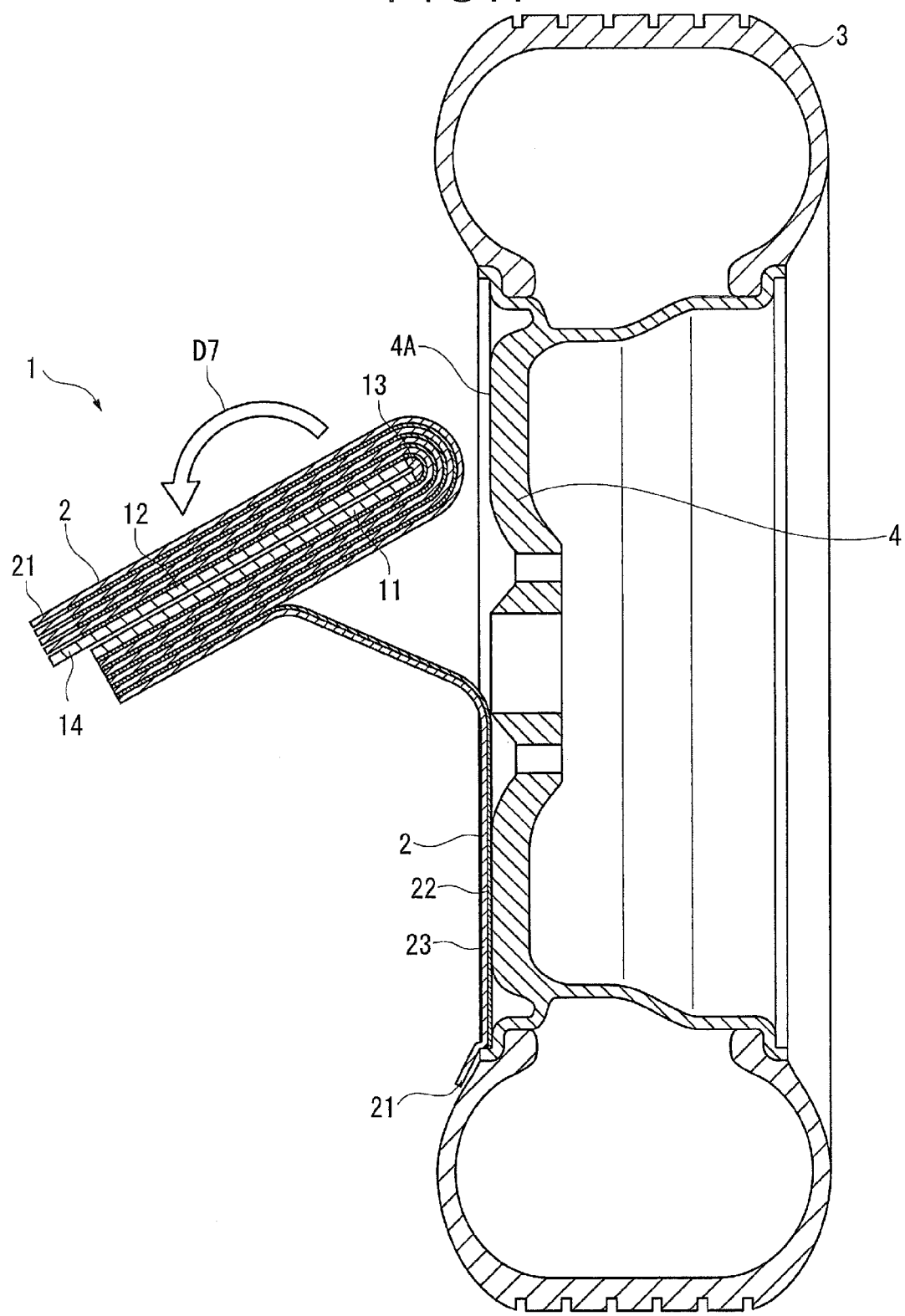
FIG. 7 is a sectional view showing a fourth step of the sheet sticking method.

FIG. 7 is a sectional view showing a fourth step for sticking the remaining portion of the protection sheet 2 on the wheel 4.

In the fourth step, while the sheet sticking tool 1 is kept held by the portion including the tab 14, the sheet sticking tool 1 is moved along the wheel surface 4A in an arrow D6 direction shown in FIG. 6. Subsequently, a portion including the connecting portion 13 is turned upward in an arrow D7 direction. In this manner, the remaining portion of the protection sheet 2 is peeled off from the multilayered body, so that a remaining portion of the adhesive layer 22 is also exposed. After being exposed, the remaining portion of the adhesive layer 22 is pressed against the wheel surface 4A to be stuck.

Figure 8:
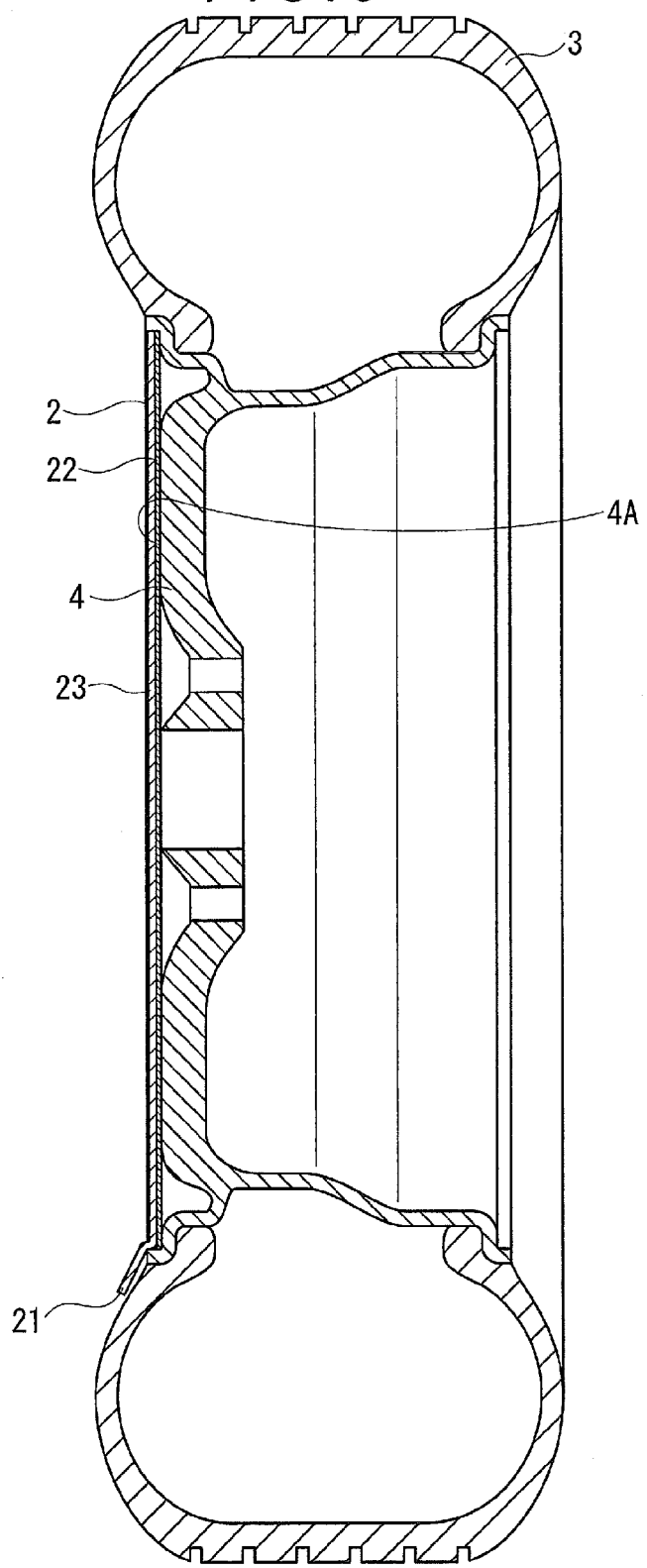
FIG. 8 is a sectional view showing an adherend stuck with the sheet.

FIG. 8 is a sectional view showing that the protection sheet 2 is wholly stuck on the wheel 4.

Since substantially the half of the protection sheet 2 is stuck at the predetermined position in advance in the third step, when the other half of the protection sheet 2 is stuck, the protection sheet 2 can be easily and accurately stuck on the wheel surface 4A at a desired position.

Advantages and Effects of First Exemplary Embodiment

When the above sheet sticking method is carried out using the sheet sticking tool 1, the following advantages can be obtained.

Regardless of the skill of a worker, the protection sheet 2 can be easily half-peeled and thus easily stuck on the wheel 4.

The sheet sticking tool 1 includes the semicircular bodies 11, 12 that are connected to each other at the chords 15, 16 via the connecting portion 13 in a foldable manner. With the above arrangement, it is possible to easily and reliably carry out the first step for folding the sheet sticking tool 1 and the second step for half-peeling the protection sheet 2 to expose the adhesive layer 22 in the substantially semicircular shape.

The sheet sticking tool 1 includes: the pair of semicircular bodies 11, 12 having the chords 15, 16 that are substantially as long as the diameter of the wheel surface 4A; and the connecting portion 13 that connects the pair of bodies 11, 12 at the chords 15, 16. With the above arrangement, since the sheet sticking tool 1 is formed in a circular shape that is substantially as large as the protection sheets 2, when the sheet sticking tool 1 and the protection sheets 2 are stuck together with their outer circumferences being aligned, the folded position of the sheet sticking tool 1 can coincide with the diametral position of the protection sheets 2 with a higher reliability. As a result, the protection sheets 2 can be folded at the diametral position with a higher reliability, thereby more easily half-peeling each of the protection sheets 2.

For the first exemplary embodiment, description was made on the multilayered-type arrangement in which the plurality of protection sheets 2 are layered on the sheet sticking tool 1. Such a multilayered-type arrangement requires the sheet sticking tool 1 to be folded for plural times because one of the protection sheets 2 is peeled to be stuck on the wheel 4 and another one of the protection sheets 2 is peeled to be stuck on another wheel 4. Since the sheet sticking tool 1 includes the bodies 11, 12 and the connecting portion 13 that connects the bodies 11, 12 as described above, the sheet sticking tool 1 is foldable at the same position, i.e., the folded position P. Thus, each of the layered protection sheets 2 can be stably half-peeled, which contributes to stabilizing the sticking operation.

When the sheet sticking tool 1, the base 23 and the adhesive layer 22 are made of a light-transmissive material, it is possible to visually check the shape and the position of the wheel 4 through these members for sticking each of the protection sheets 2 on the wheel 4. As a result, each of the protection sheets 2 can be easily positioned relative to the wheel 4.

Each of the protection sheets 2 is formed in a substantially circular shape that is substantially the same in diameter as the wheel surface 4A so that the protection sheet 2 can cover the wheel surface 4A. With the above arrangement, one of the protection sheets 2 is peeled in a semicircular shape substantially as large as the semicircular shape of the wheel surface 4A in the second step, so that the adhesive layer 22 is exposed in the substantially semicircular shape. When the arc of the exposed substantially semicircular portion of the adhesive layer 22 is aligned with the outer circumference of the circular shape of the wheel surface 4A, the protection sheet 2 can be easily positioned to be stuck.

Second Exemplary Embodiment

Next, description will be made on a sheet sticking method according to a second exemplary embodiment of the invention with reference to the attached drawings. It should be noted that the same components as those already described will be attached with the same reference numbers in the following description to omit or simplify the explanation thereof.

Although the sheet sticking tool 1 described in the first exemplary embodiment is also used in the second exemplary embodiment to stick each of the protection sheets 2 on the wheel 4, a sheet sticking method according to the second exemplary embodiment is different from that of the first exemplary embodiment in that another step is added to the sheet sticking method according to the second exemplary embodiment.

According to the second exemplary embodiment, after one of the protection sheets 2 is half-peeled in the second step of the sheet sticking method according to the first exemplary embodiment, a third step different from that of the first exemplary embodiment is carried out. First and second steps of the second exemplary embodiment are the same as those of the first exemplary embodiment.

Third Step (Second Exemplary Embodiment)

Figure 9:
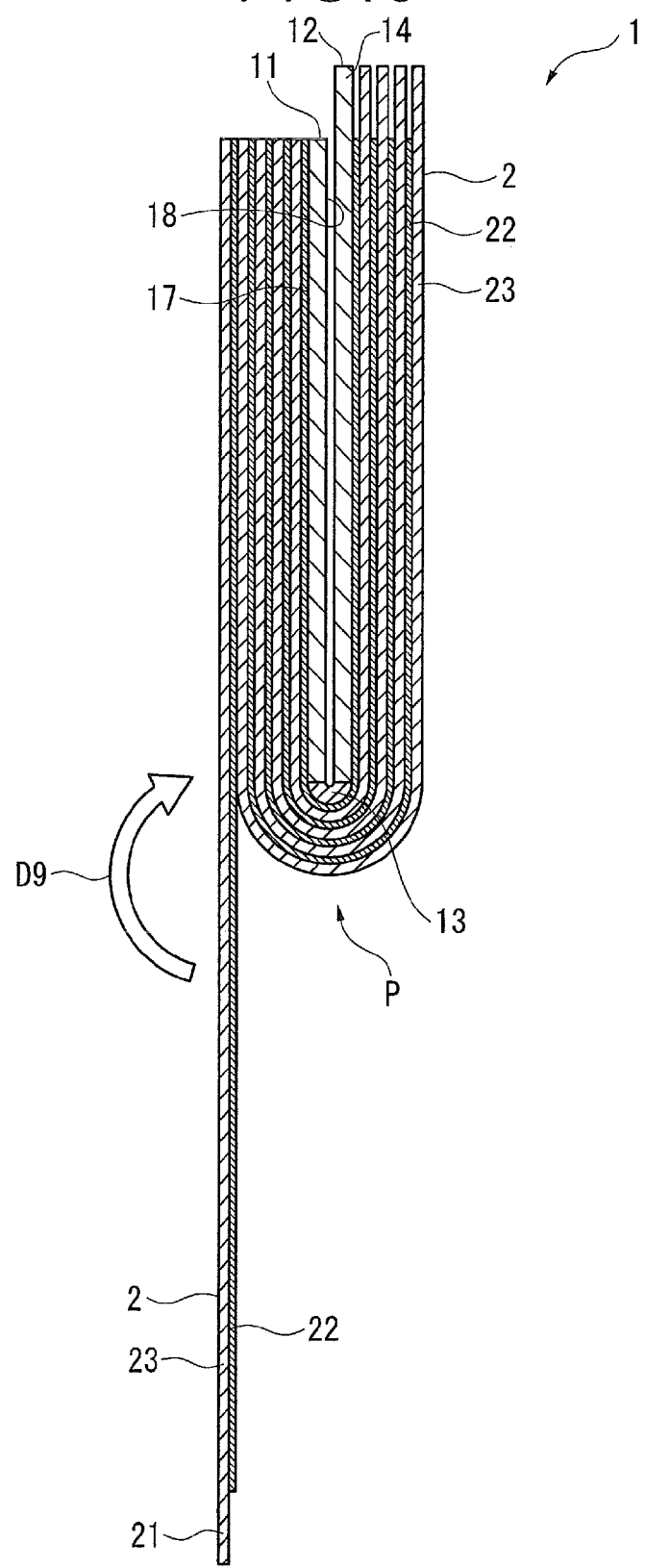
FIG. 9 is a sectional view showing a third step of a sheet sticking method according to a second exemplary embodiment of the invention.
Figure 10:
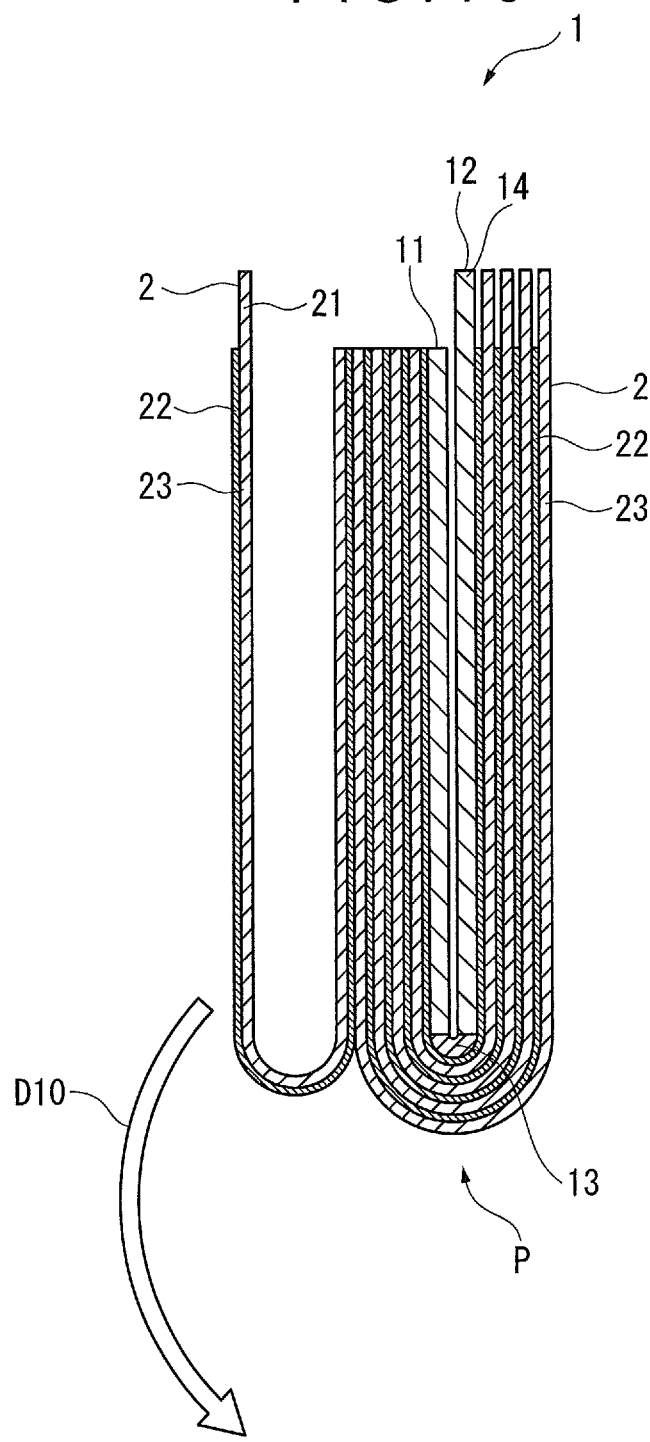
FIG. 10 is a sectional view showing a fourth step of the sheet sticking method according to the second exemplary embodiment.

FIG. 9 shows the third step according to the second exemplary embodiment. FIG. 10 shows a condition after the one of the protection sheets 2 is turned over in the third step according to the second exemplary embodiment.

In the third step according to the second exemplary embodiment, the portion of the protection sheet 2 peeled in the second step is turned over in a folding direction of the sheet sticking tool 1 (an arrow D9 direction in FIG. 9) with the adhesive layer 22 kept partly exposed. As shown in FIG. 10, the protection sheet 2 is turned over toward the body 11 such that the surface of the base 23 on which the adhesive layer 22 is not provided comes inside, so that the adhesive layer 22 is exposed in a substantially semicircular shape.

Fourth Step (Second Exemplary Embodiment)

Figure 11:
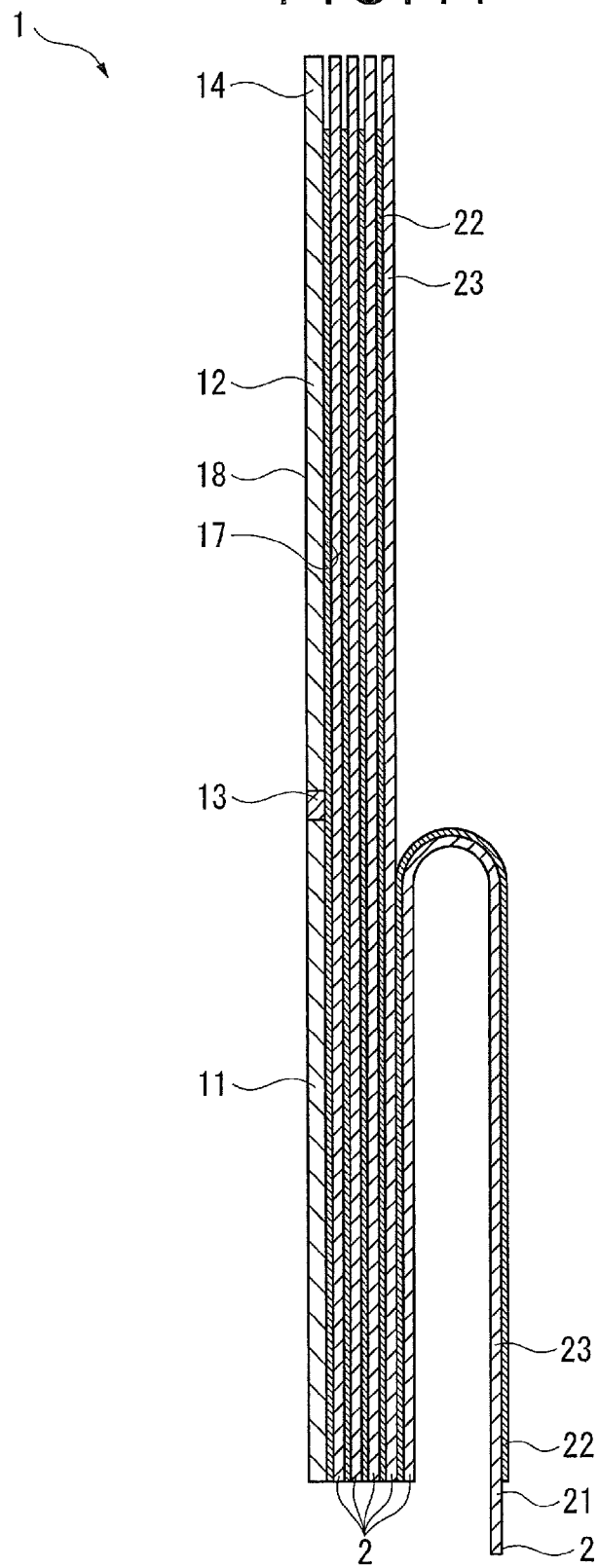
FIG. 11 is a sectional view showing a condition after the fourth step of the sheet sticking method according to the second exemplary embodiment.

FIG. 11 is a sectional view showing a condition after the sheet sticking tool 1 is unfolded in a fourth step according to the second exemplary embodiment.

In the fourth step, the sheet sticking tool 1, which is folded in the semicircular shape, is unfolded in an arrow D10 direction shown in FIG. 10 into the circular shape. At this time, the protection sheet 2 is kept turned over as in the third step according to the second exemplary embodiment with the adhesive layer 22 thereof being partly exposed in the substantially semicircular shape.

Fifth Step (Second Exemplary Embodiment)

Figure 12:
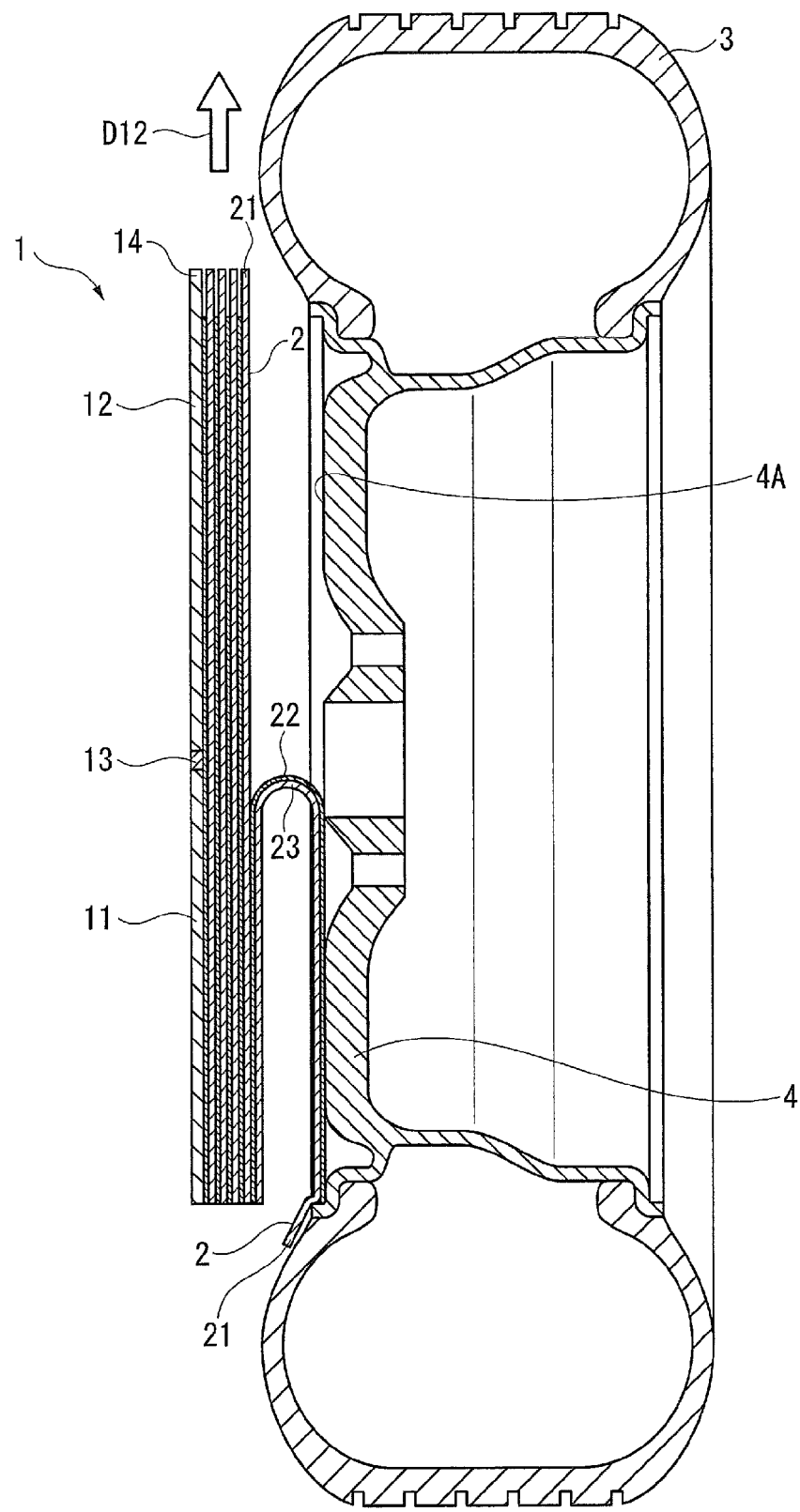
FIG. 12 is a sectional view showing a condition after a fifth step of the sheet sticking method according to the second exemplary embodiment.

FIG. 12 is a sectional view showing a fifth step for sticking the adhesive layer 22 on the wheel 4 of the automobile tire 3.

In the fifth step, the sheet sticking tool 1 and the protection sheets 2 are held by a portion including the tab 14 and a portion including the tabs 21. Since the sheet sticking tool 1 is returned to the circular shape, it is possible to simultaneously hold the protection sheets 2 by the portion including the tabs 21 along with the body 11 of the sheet sticking tool 1. In other words, as compared with an arrangement in which only the peeled half of the protection sheet 2 is held, a portion with a larger thickness can be held. Moreover, the body 11 also serves as a support plate for supporting the peeled half of the protection sheet 2.

After the sheet sticking tool 1 and the protection sheets 2 are held, the portion of the adhesive layer 22 exposed in the substantially semicircular shape is positioned to be aligned with the outer circumference of the wheel surface 4 and the adhesive layer 22 is pressed against the wheel 4, thereby sticking the half of the protection sheet 2.

Sixth Step (Second Exemplary Embodiment)

Figure 13:
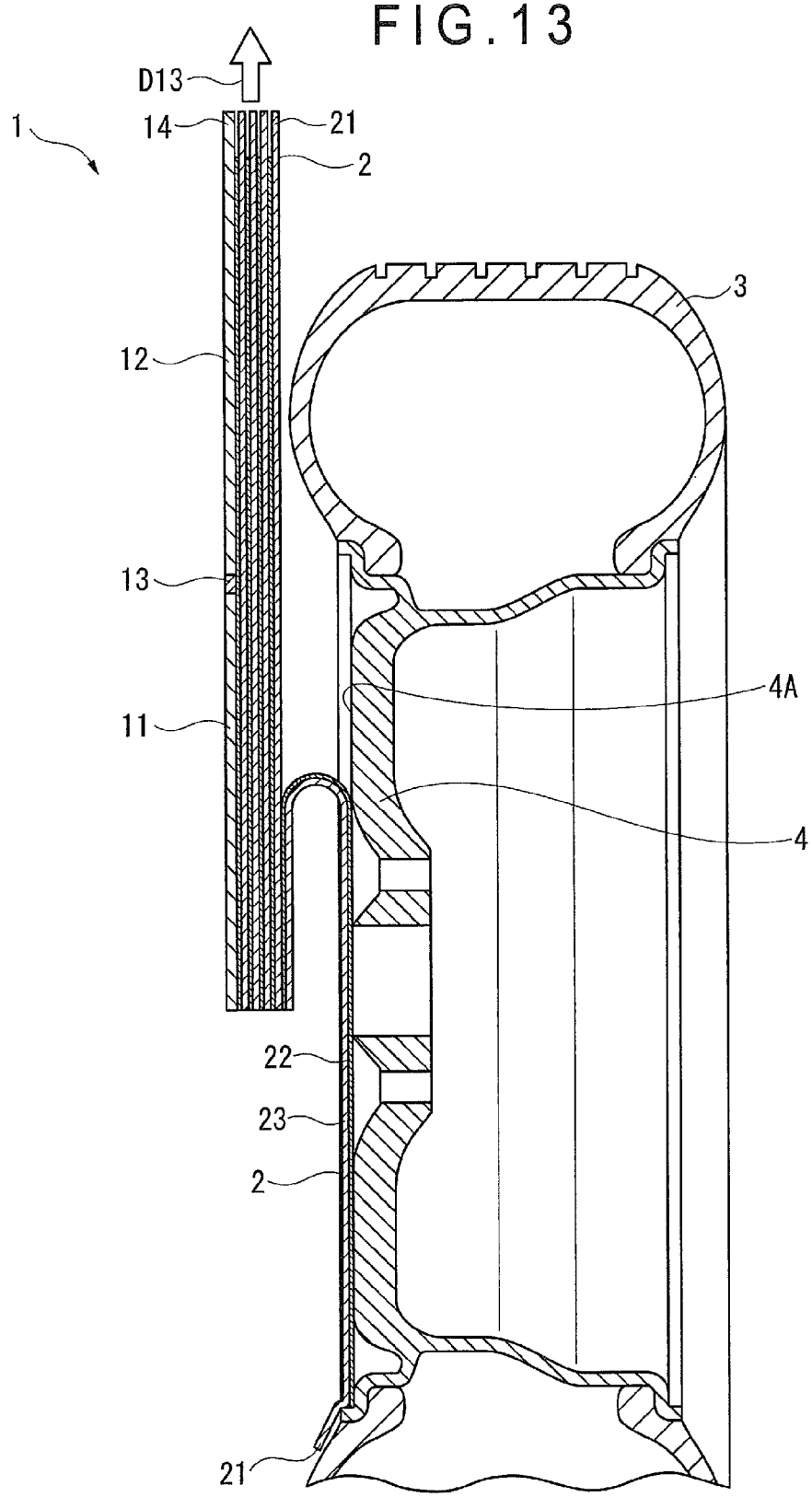
FIG. 13 is a sectional view showing a sixth step of the sheet sticking method according to the second exemplary embodiment.

FIG. 13 is a sectional view showing a sixth step for sticking a remaining portion of the protection sheet 2 on the wheel 4.

In the sixth step, the sheet sticking tool 1, which is held by the portion including the tab 14, is moved in an arrow D12 direction shown in FIG. 12 and is then moved along the wheel surface 4A in an arrow direction D13 shown in FIG. 13. In this manner, the remaining portion of the protection sheet 2 is peeled off from the multilayered body, so that a remaining portion of the adhesive layer 22 is also exposed. After being exposed, the remaining portion of the adhesive layer 22 is pressed against the wheel surface 4A to be stuck.

A condition after the whole protection sheet 2 is completely stuck on the wheel 4 is shown in the sectional view of FIG. 8 as well as that of the first exemplary embodiment.

Advantages and Effects of Second Exemplary Embodiment

The sheet sticking method according to the second exemplary embodiment can provide the following advantages in addition to those listed above in relation to the first exemplary embodiment.

In the fourth step according to the second exemplary embodiment, the body 11 is unfolded with the protection sheet 2 being turned over toward the body 11 as in the third step, so that the sheet sticking tool 1, which is folded in the semicircular shape, is returned to the circular shape. As a result, the peeled half of the protection sheets 2 can be held along with the body 11 of the sheet sticking tool 1 at the same time. Specifically, through the above step, as compared with an arrangement in which only the peeled half of the protection sheet 2 is held, a portion with a larger thickness can be held. Moreover, the body 11 also serves as a support plate for supporting the peeled half of the protection sheet 2. As a result, the protection sheet 2 can be easily positioned relative to the wheel 4 and stuck on it.

In the fourth step according to the second exemplary embodiment, each of the protection sheets 2 is formed in the circular shape that is substantially the same in diameter as the wheel surface 4A so that the protection sheet 2 can cover the wheel surface 4A. With the above arrangement, the one of the protection sheets 2 is peeled in the semicircular shape substantially as large as that of the wheel surface 4A to expose the adhesive layer 22 in the substantially semicircular shape.

The sheet sticking tool 1 is formed in substantially the same shape as a contour of each of the protection sheets 2. With the above arrangement, when the sheet sticking tool 1 is unfolded to the original shape in the fourth step and the peeled half of the one of the protection sheets 2 is held along with the body 11, the arc of the substantially semicircular shape of the exposed adhesive layer 22 can be aligned with the outer circumference of the sheet sticking tool 1.

By aligning the outer circumference of the sheet sticking tool 1 with the outer circumference of the wheel surface 4A, the arc of the substantially semicircular shape of the exposed adhesive layer 22 is easily positioned to be aligned with the outer circumference of the circular shape of the wheel surface 4A.

The sheet sticking tool 1 includes the semicircular bodies 11, 12 that are connected to each other at the chords 15, 16 via the connecting portion 13 in a foldable manner as described above. With the above arrangement, the fourth step for unfolding the half-folded sheet sticking tool 1 to the original circular shape can be easily and reliably carried out.

In the sixth step according to the second exemplary embodiment, the sheet sticking tool 1 is moved along the wheel surface 4A to expose the remaining portion of the protection sheet 2. With the above arrangement, the remaining portion of the protection sheet 2 can be easily exposed as compared with the fourth step according to the first exemplary embodiment. As described above, with the sheet sticking method according to the second exemplary embodiment, it is possible to easily and quickly stick the protection sheet 2 on the wheel surface 4A while exposing the other half of the protection sheet 2.

Third Exemplary Embodiment

Next, description will be made on a sheet sticking method according to a third exemplary embodiment of the invention with reference to the attached drawings. It should be noted that the same components as those already described will be attached with the same reference numbers in the following description to omit or simplify the explanation thereof.

Although the sheet sticking tool 1 described in the first exemplary embodiment is also used in the third exemplary embodiment to stick each of the protection sheets 2 on the wheel 4, the third exemplary embodiment is different in sheet sticking method from the first exemplary embodiment in that another step is added to a sheet sticking method according to the third exemplary embodiment.

Further, the third exemplary embodiment is different from the second exemplary embodiment in that the sheet sticking method according to the third exemplary embodiment does not include the fourth step of the sheet sticking method according to the second exemplary embodiment for unfolding the sheet sticking tool 1 (see FIGS. 10 and 11).

According to the sheet sticking method of the third exemplary embodiment, the same steps as the first and second steps according to the first exemplary embodiment are followed by the same step as the third step according to the second exemplary embodiment.

Fourth Step (Third Exemplary Embodiment)

Figure 14:
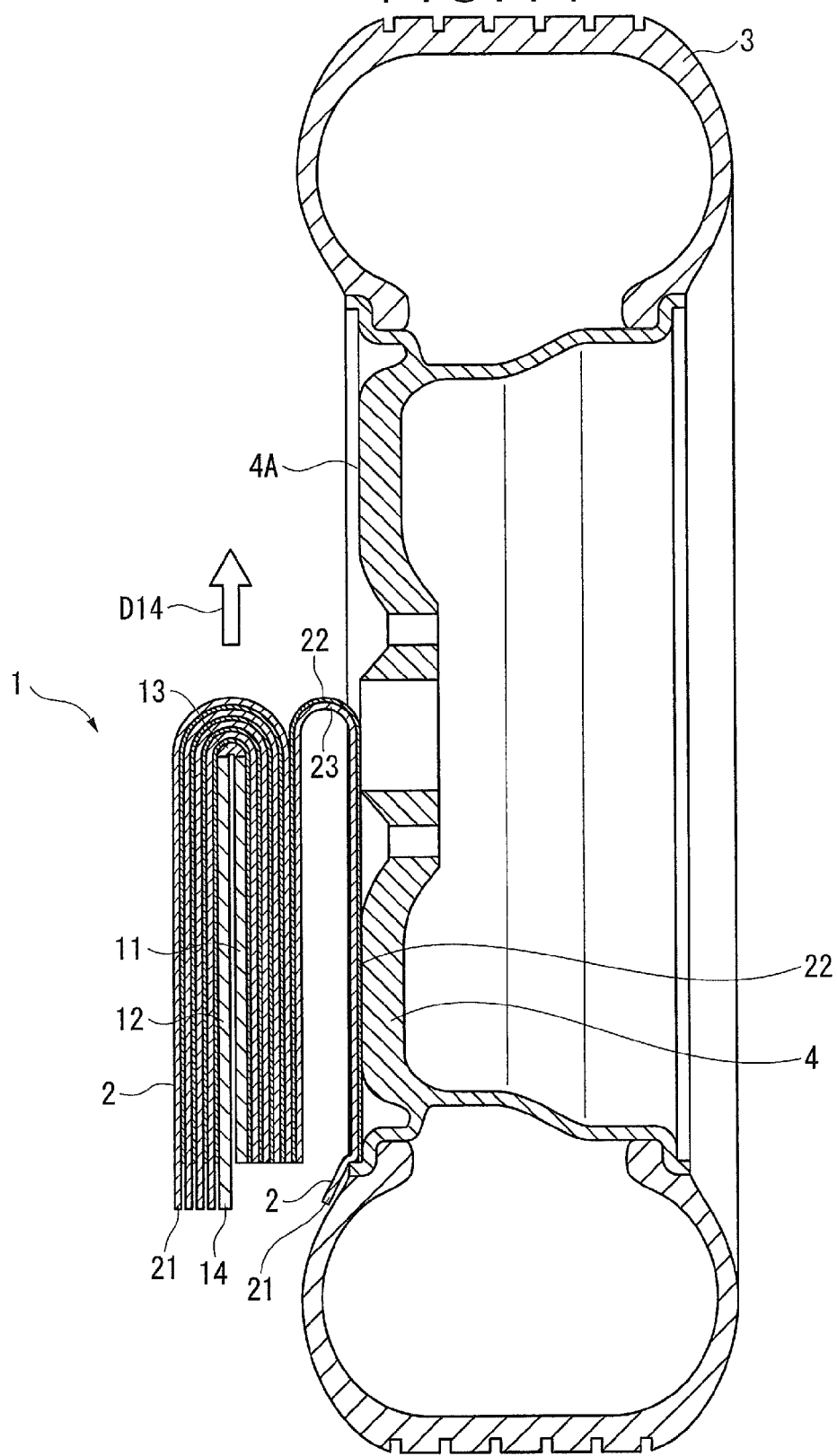
FIG. 14 is a sectional view showing a fourth step of a sheet sticking method according to a third exemplary embodiment of the invention.

FIG. 14 is a sectional view showing a fourth step according to the third exemplary embodiment for sticking the adhesive layer 22 on the wheel 4 of the automobile tire 3.

According to the third exemplary embodiment, after the third step, the folded sheet sticking tool 1 is not unfolded in the arrow D10 direction shown in FIG. 10 but is positioned such that the portion of the adhesive layer 22 exposed in the substantially semicircular shape is aligned with the outer circumference of the wheel 4 as shown in FIG. 14. The adhesive layer 22 is then pressed against the wheel 4, thereby sticking the half of the protection sheet 2. Although both the sheet sticking tool 1 and the protection sheets 2 are folded in the substantially semicircular shape in this fourth step unlike in the second exemplary embodiment, the layered protection sheets 2 can be held by a portion including the tabs 21 along with the body 11 of the sheet sticking tool 1. In other words, the worker can hold a portion with a larger thickness as compared with an arrangement in which only the peeled half of the protection sheet 2 is held. Moreover, the body 11 also serves as a support plate for supporting the peeled half of the protection sheet 2.

Fifth Step (Third Exemplary Embodiment)

Figure 15:
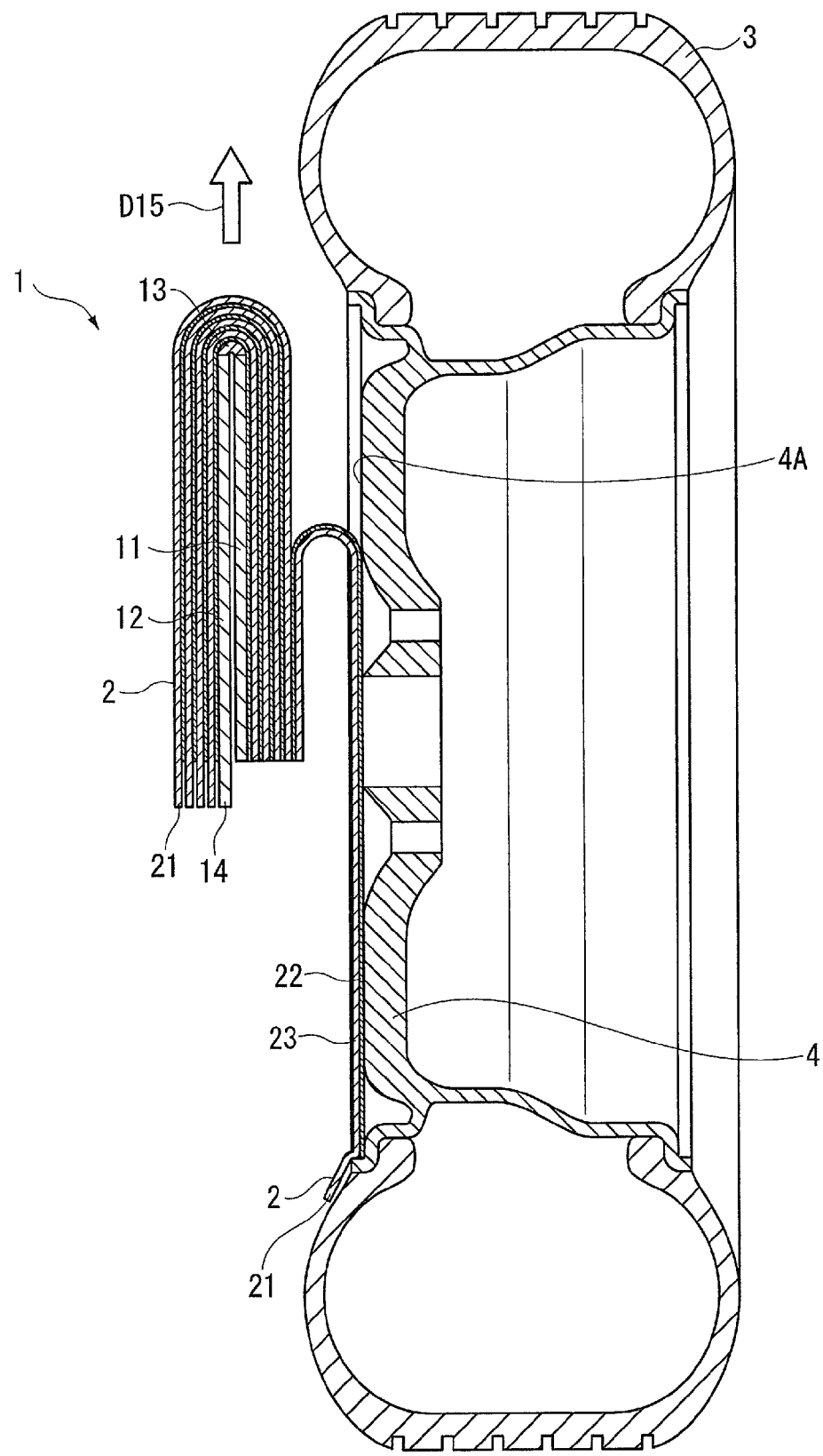
FIG. 15 is a sectional view showing a condition after a fifth step of the sheet sticking method according to the third exemplary embodiment.

FIG. 15 is a sectional view showing a fifth step according to the third exemplary embodiment for sticking the other half of the protection sheet 2 on the wheel 4.

In the fifth step, the sheet sticking tool 1 is moved along the wheel surface 4A in an arrow D14 direction shown in FIG. 14 and then moved in an arrow D15 direction shown in FIG. 15. In this manner, the other half of the protection sheet 2 is peeled off from the multilayered body, so that the other half of the adhesive layer 22 is exposed. This exposed half of the adhesive layer 22 is pressed against the wheel surface 4A to be stuck.

A condition after the whole protection sheet 2 is completely stuck on the wheel 4 is shown in the sectional view of FIG. 8 as well as that of the first exemplary embodiment.

Advantages and Effects of Third Exemplary Embodiment

The sheet sticking method according to the third exemplary embodiment can provide the following advantages in addition to those listed above in relation to the first exemplary embodiment.

With the sheet sticking method according to the third exemplary embodiment, the protection sheet 2 can be stably held as well as in the second exemplary embodiment, so that the protection sheet 2 can be easily positioned relative to the wheel 4 and stuck on it.

Moreover, with the sheet sticking method according to the third exemplary embodiment, the outer circumference of the sheet sticking tool 1 is aligned with the outer circumference of the wheel surface 4A, thereby easily positioning the arc of the substantially semicircular shape of the exposed adhesive layer 22 to be aligned with the outer circumference of the circular shape of the wheel surface 4A.

Fourth Exemplary Embodiment

Next, description will be made on a sheet sticking tool 1A according to a fourth exemplary embodiment of the invention with reference to the attached drawings. The sheet sticking tool 1A is different from the sheet sticking tool 1 according to the first exemplary embodiment in terms of a connecting portion thereof.

Figure 16:
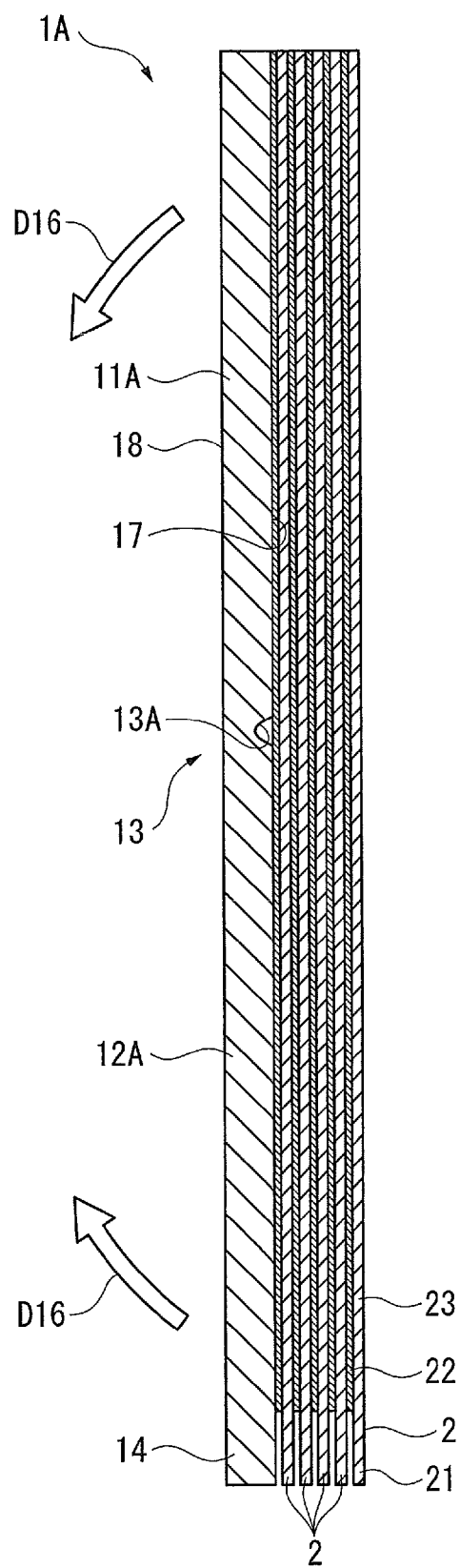
FIG. 16 is a sectional view showing a sheet sticking tool according to a fourth exemplary embodiment on which sheets are layered.

FIG. 16 shows the sheet sticking tool 1A. It should be noted that the same components as those already described will be attached with the same reference numbers in the following description to omit or simplify the explanation thereof.

The sheet sticking tool 1A is formed in a substantially circular shape in line with the contour of the protection sheets 2 in the same manner as in the first exemplary embodiment. First body 11A and second body 12A of the sheet sticking tool 1A are each formed in a semicircular shape as well as the bodies 11, 12 according to the first exemplary embodiment, but a thickness of the first body 11A and the second body 12A is larger than that of the bodies 11, 12. A material for the sheet sticking tool 1A is preferably a flexible plastic capable of deformation.

As shown in FIG. 16, a connecting portion 13A according to the fourth exemplary embodiment includes a notch 13A formed between the first body 11A and the second body 12A. The notch 13A is a substantially V-shaped groove formed along a diametral position of the circular shape of the sheet sticking tool 1A. The notch 13A is formed, for instance, by making a groove in a circular plate along a diametral position thereof.

According to the fourth exemplary embodiment, as shown in FIG. 16, the plurality of protection sheets 2 are layered on a surface of the sheet sticking tool 1A provided with the notch 13A. The sheet sticking tool 1A is folded in an arrow D16 direction shown in FIG. 16 such that a second surface 18, in which the notch 13A is not provided, comes inside.

Advantages and Effects of Fourth Exemplary Embodiment

The sheet sticking tool 1A can also be folded in the semi-circular shape along the diametral position with the assistance of the notch 13A.

With the above arrangement, the sheet sticking tool 1A is also usable to carry out the sheet sticking methods according to the first to third exemplary embodiments and provides the same advantages.

Fifth Exemplary Embodiment

Next, description will be made on a sheet sticking tool 1B according to a fifth exemplary embodiment of the invention with reference to the attached drawings. The sheet sticking tool 1B is different from the sheet sticking tool 1 according to the first exemplary embodiment in terms of a connecting portion thereof.

Figure 17:
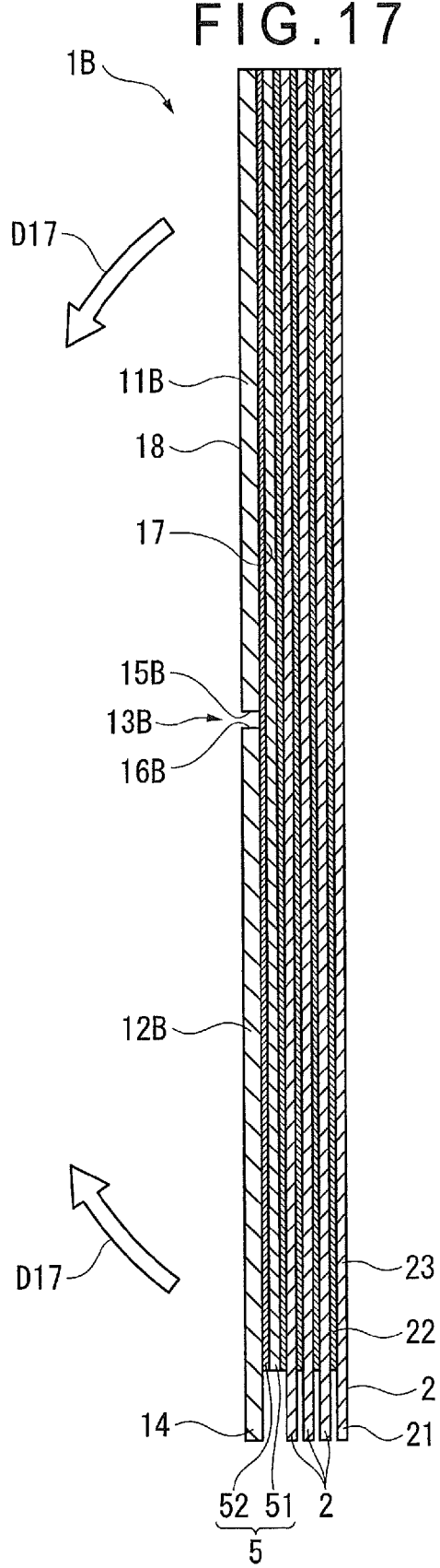
FIG. 17 is a sectional view showing a sheet sticking tool according to a fifth exemplary embodiment on which sheets are layered.

FIG. 17 shows the sheet sticking tool 1B. It should be noted that the same components as those already described will be attached with the same reference numbers in the following description to omit or simplify the explanation thereof.

The sheet sticking tool 1B is formed in a substantially semicircular shape in line with the contour of the protection sheets 2 in the same manner as in the first exemplary embodiment. The sheet sticking tool 1B includes a first body 11B and a second body 12B, which are each formed in a semicircular shape in the same manner as the bodies 11, 12 according to the first exemplary embodiment. The first body 11B includes a first chord 15B similar to the first chord 15 according to the first exemplary embodiment, and the second body 12B includes a second chord 16B similar to the second chord 16 according to the first exemplary embodiment.

As shown in FIG. 17, the bodies 11B, 12B are connected to each other via a connecting sheet 5 at a connecting portion 13B according to the fifth exemplary embodiment. The connecting sheet 5 includes a base 51 and an adhesive layer 52 formed on one surface of the base 51. The connecting sheet 5 is stuck o the bodies 11B, 12B through the adhesive layer 52. A dimension of the adhesive layer 52 is not subject to a particular limitation and is formed substantially as large as a circular shape of the sheet sticking tool 1B. While the chords 15B, 16B are spaced from each other at a predetermined interval, the first body 11B and the second body 12B are connected to each other via the connecting sheet 5 stuck on a surface of the bodies 11B, 12B (the first surface 17).

According to the fifth exemplary embodiment, as shown in FIG. 17, the plurality of protection sheets 2 are layered on the connecting sheet 5 on the first surface 17. The sheet sticking tool 1B is folded in an arrow D17 direction shown in FIG. 17 such that the second surface 18, on which the connecting sheet 5 is not stuck, comes inside.

Materials and dimensions of the base 51 and the adhesive layer 52 of the connecting sheet 5 may be the same as those of the protection sheets 2 described in relation to the first exemplary embodiment. However, it is preferable that the materials and dimensions of the base 51 and the adhesive layer 52 are determined such that an adhesive force between the connecting sheet 5 and the bodies 11, 12 is larger than an adhesive force between the connecting sheet 5 and the protection sheets 2. With the above arrangement, even though the protection sheets 2 are stuck on the connecting sheet 5, the connecting sheet 5 is prevented from being peeled from the sheet sticking tool 1B along with the protection sheets 2 when the protection sheets 2 are peeled.

Advantages and Effects of Fifth Exemplary Embodiment

The sheet sticking tool 1B can also be folded in the semi-circular shape along the diametral position with the assistance of the connecting portion 13B provided by the connecting sheet 5. Thus, the sheet sticking tool 1B is also usable to carry out the sheet sticking methods according to the first to third exemplary embodiments and provides the same advantages.

Modifications of Embodiments

The invention is not limited to the above exemplary embodiments but may include the following modifications and the like as long as an object of the invention can be achieved.

Although the adherend is exemplified by a circular automobile wheel in the above exemplary embodiment, it is merely exemplary. The invention is applicable even when the adherend surface of the adherend is, for instance, rectangular, polygonal, oval or the like.

Figure 18:
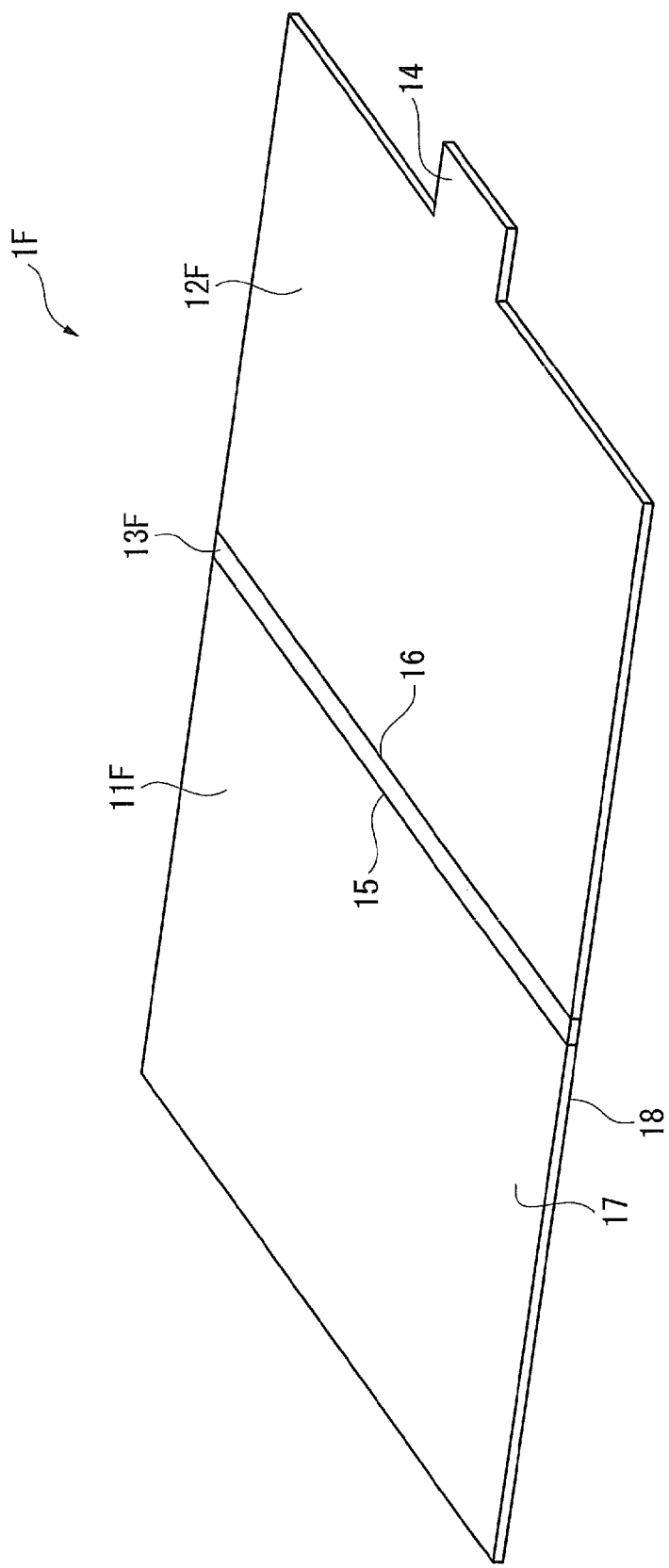
FIG. 18 is a perspective view showing a sheet sticking tool according to a modification of the exemplary embodiment of the invention.

Although each of the sheet sticking tools 1, 1A, 1B is formed in the circular shape in line with the circular adherend in the above exemplary embodiments, it is merely exemplary. The shape of the sheets may be determined in accordance with the shape of the adherend, and the shape of the sheet sticking tool may be determined in accordance with the shape of the sheets. The sheet sticking tool may be designed in any manner as long as the sheets stuck thereon can be folded along the symmetry-axis position. The symmetry-axis position is not necessarily exactly the same as the symmetry axis but may be a position along which the sheets 2 are foldable substantially in half The adherend whose shape is not a circle is exemplified by a rectangular window glass, which will be described below. An adherend surface of such an adherend is rectangular. Examples of a sheet to be stuck on the window glass include a protection sheet, a heat-shielding sheet and a security sheet The sheet is formed in substantially the same rectangular shape as a glass surface of the window glass. A sheet sticking tool 1F in substantially the same rectangular shape as the sheet shown in FIG. 18 is preferably used. The sheet sticking tool 1F includes: a first body 11F and a second body 12F each being fanned in a rectangular shape being substantially half as large as the sheet; and a connecting portion 13F through which the first body 11F and the second body 12F are connected in a foldable manner along a symmetry axis of the sheet to be stuck. The bodies 11F, 12F include chords 15, 16 in the same manner as the bodies 11, 12 according to the above exemplary embodiment. The materials described in relation to the above exemplary embodiments are usable for the bodies 11F, 12F and the connecting portion 13F.

Likewise, even with the sheet sticking tool 1F, the sheet can be easily half-peeled though the steps described in relation to the above exemplary embodiment. As a result, the sheet can be easily stuck on the window glass.

Figure 19:
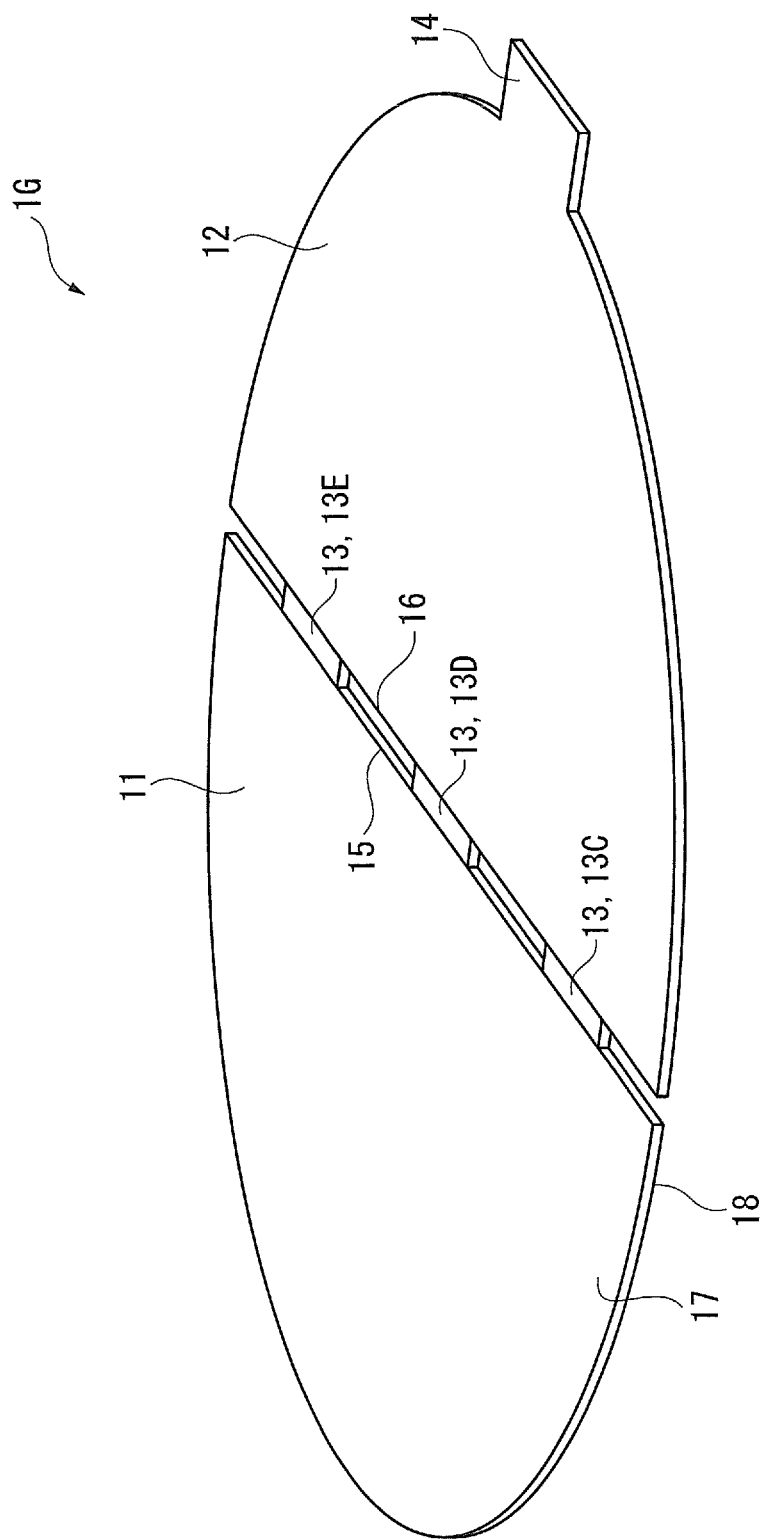
FIG. 19 is a perspective view showing a sheet sticking tool according to another modification of the exemplary embodiment of the invention.
Figure 20:
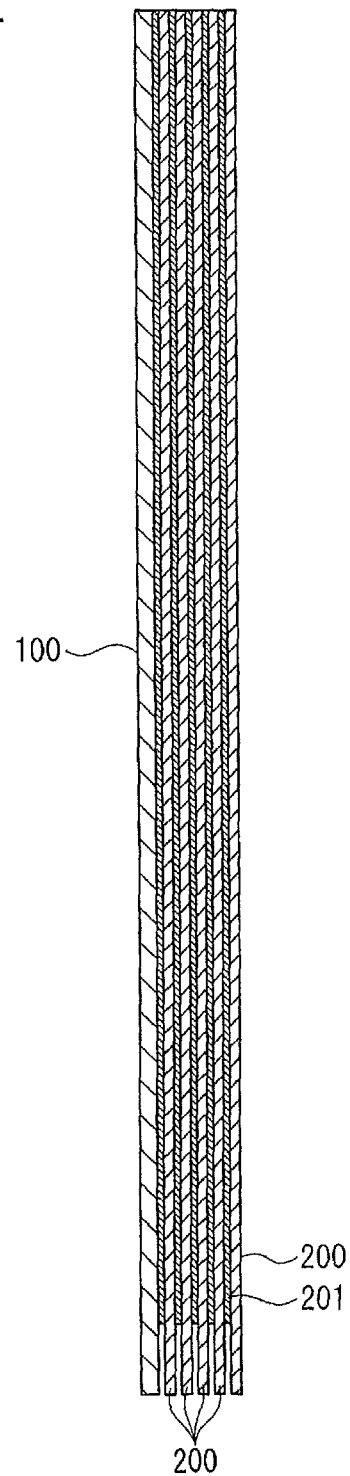
FIG. 20 schematically shows a typical sheet sticking tool with protection sheets layered thereon.

The number of the connecting portion is not limited to one. A plurality of connecting portions may be provided as long as when the tool is folded, the sheet layered on the tool is foldable along the symmetry-axis position. For instance, as shown in FIG. 19, the first body 11 and the second body 12 of a sheet sticking tool 1G are connected through the connecting portion 13 including a plurality of connecting portions 13C, 13D, 13E.

The sheet sticking method according to the above exemplary embodiment is merely exemplary. According to the third exemplary embodiment, the sheet sticking tool 1 is moved along the wheel surface 4A after the exposed half of the adhesive layer 22 is stuck on the wheel surface 4A in the fourth step. However, for instance, after the fourth step but before the fifth step, the sheet sticking tool 1 may be moved along the wheel surface 4A after the sheet sticking tool 1 is unfolded into the substantially circular shape from the substantially semicircular shape.

Although the notch 13A is formed in the first surface of the sheet sticking tool 1A according to the fourth exemplary embodiment, the notch 13A may be formed in each of both surfaces. When the notch 13A is formed in each of both surfaces, the sheet sticking tool 1A is foldable in both opposite directions.

The sheet sticking tool 1 preferably has size and weight appropriate for a worker to hold it during the sticking operation. Specifically, when the adherend is an automobile wheel, the diameter of the wheel is preferably set in a range approximately from 14 inches (35.56 cm) to 20 inches (50.80 cm) so that the invention is applicable to the wheel.

The adherend surface of the adherend may be not only flat but also curved. When the adherend surface is curved, the protection sheet is preferably provided by a material of shape-following properties and in a thickness capable of ensuring the shape-following properties.

The invention claimed is:

1. A sheet sticking method of sticking a sheet on an adherend surface of an adherend, the sheet being formed in substantially the same shape as the adherend surface, the sheet comprising a base and an adhesive layer formed on one surface of the base, the sheet sticking method comprising:

sticking the sheet on a first surface of a sticking tool through the adhesive layer, the sticking tool being foldable along a symmetry-axis position of the sheet;

folding the sticking tool along with the sheet such that a second surface opposite to the first surface of the sticking tool comes inside;

peeling the sheet to a folded portion of the sticking tool to expose a portion of the adhesive layer while the sticking tool is folded;

pressing the exposed portion of the adhesive layer against the adherend surface to stick a portion of the sheet on the adherend; and exposing a remaining portion of the adhesive layer of the sheet and pressing the remaining portion against the adherend surface to stick a remaining portion of the sheet on the adherend.

2. The sheet sticking method according to claim 1, further comprising:

after the peeling of the sheet to the folded position of the sticking tool to expose the portion of the adhesive layer, turning over the sheet in a folding direction of the sticking tool with the portion of the adhesive layer being exposed; and unfolding the folded sticking tool in a direction opposite to the folding direction of the sticking tool with the portion of the adhesive layer being exposed and the sheet being turned over.

3. he sheet sticking method according to claim 1, further comprising, after the peeling of the sheet to the folded position of the sticking tool to expose the portion of the adhesive layer, turning over the sheet in a folding direction of the sticking tool with the portion of the adhesive layer being exposed.

4. The sheet sticking method according to claim 1, wherein for sticking the remaining portion of the sheet on the adherend, the sticking tool is moved along the adherend surface to expose the remaining portion of the adhesive layer of the sheet.

5. The sheet sticking method according to claim 1, wherein each of the sticking tool, the sheet and the adhesive layer is made of a light-transmissive material.

6. The sheet sticking method according to claim 1, wherein the adherend surface of the adherend is formed in a substantially circular shape, the sheet is formed in a substantially circular shape that is substantially the same in diameter as the adherend surface, and the sticking tool is foldable along a diametral position of the sheet.

7. A sheet sticking tool usable to stick a sheet on an adherend surface of an adherend, the sheet being formed in substantially the same shape as the adherend surface, the sheet comprising a base and an adhesive layer formed on one surface of the base, the sheet sticking tool comprising:

a first body having a first side that is substantially as long as a symmetry axis of the sheet within a contour of the sheet;

a second body having a second side that is substantially as long as the symmetry axis within the contour of the sheet; and a connecting portion through which the first side of the first body and the second side of the second body are connected to each other and at which the sheet sticking tool is foldable.

8. The sheet sticking tool according to claim 7, wherein
the connecting portion is provided by a connecting sheet that is stuck on surfaces of the first body and the second body to connect the first body and the second body,
the sheet is stuck on the connecting sheet, and
an adhesive force between the connecting sheet and the surfaces of the first body and the second body is larger than an adhesive force between the sheet and the connecting sheet.

9. The sheet sticking tool according to claim 7, wherein
the adherend surface of the adherend is formed in a substantially circular shape,
the sheet is formed in a substantially circular shape that is substantially the same in diameter as the adherend surface,
the first body is formed in a substantially semicircular shape and has a first chord substantially as long as a diameter of the sheet, and the second body is formed in a substantially semicircular shape and has a second chord substantially as long as the diameter of the sheet, and
the first chord of the first body and the second chord of the second body are connected to each other through the connecting portion.

10. The sheet sticking tool according to claim 7, wherein the adherend is provided by an automobile wheel.

\* \* \* \* \*